(12) United States Patent
Nakibly et al.

(10) Patent No.: US 9,612,611 B1
(45) Date of Patent: Apr. 4, 2017

(54) GLITCH-FREE CLOCK MULTIPLEXER

(71) Applicant: Amazon Technologies, Inc., Seattle, WA (US)

(72) Inventors: Guy Nakibly, Kedumim (IL); Usama Nassir, Tira (IL); Saar Gross, Binyamina (IL); Nafea Bshara, San Jose, CA (US); Barak Wasserstrom, Mitzpe Aviv (IL); Daniel Joseph Grey, Givatayim (IL)

(73) Assignee: Amazon Technologies, Inc., Seattle, WA (US)

( * ) Notice: Subject to any disclaimer, the term of this patent is extended or adjusted under 35 U.S.C. 154(b) by 10 days.

(21) Appl. No.: 14/869,349

(22) Filed: Sep. 29, 2015

(51) Int. Cl.
*G06F 1/08* (2006.01)

(52) U.S. Cl.
CPC ...................................... *G06F 1/08* (2013.01)

(58) Field of Classification Search
CPC .... G06F 1/08; G06F 1/10; G06F 1/04; H03K 5/1252; H03K 5/135; H03K 17/693; H03K 17/005; H03K 17/162
USPC .................. 327/99, 291, 298, 407
See application file for complete search history.

(56) References Cited

U.S. PATENT DOCUMENTS

| 6,806,755 B1 * | 10/2004 | Simmonds | G06F 1/08 327/99 |
| 8,384,435 B2 * | 2/2013 | Langadi | G06F 1/08 327/99 |
| 8,803,554 B2 * | 8/2014 | Langadi | G06F 1/08 326/93 |

OTHER PUBLICATIONS

Mahmud, Rafey. Techniques to Make Clock Switching Glitch Free. [online] *EE Times*, Jun. 26, 2003 [retrieved on Oct. 9, 2015]. Retrieved from the Internet: <URL: http://www.eetimes.com/document.asp?doc_id=1202359>, 5 pages.

* cited by examiner

*Primary Examiner* — Long Nguyen
(74) *Attorney, Agent, or Firm* — Kilpatrick Townsend & Stockton LLP

(57) ABSTRACT

In a system having a first clock domain with a first clock and a second clock domain with a second clock, the first and second clocks are monitored to determine whether one or both clocks are active. The first clock is selected to be an output clock if the first clock is active and the second clock is disabled irrespective of the clock selection signal. The second clock is selected to be the output clock if the second clock is active and the first clock is disabled irrespective of the clock selection signal. If both the first clock and the second clock are active, either the first clock or the second clock is selected according to a received clock selection signal.

20 Claims, 18 Drawing Sheets

| clk_in_0 | clk_in_1 | sel_clk | clk_out |
|---|---|---|---|
| disabled | disabled | x | N/A |
| active | disabled | x | clk_in_0 |
| disabled | active | x | clk_in_1 |
| active | active | 0 | clk_in_0 |
| active | active | 1 | clk_in_1 |

FIG. 2

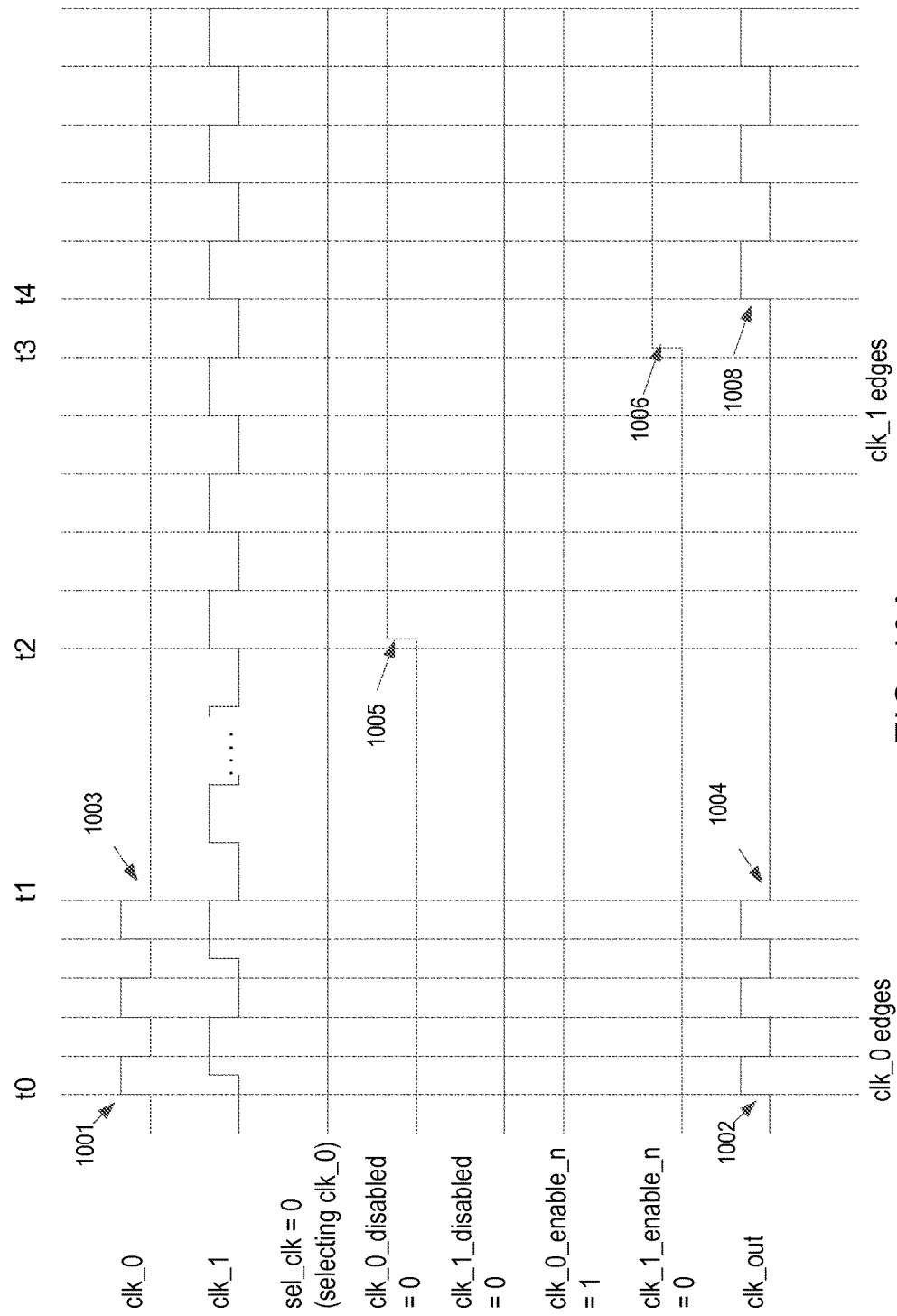

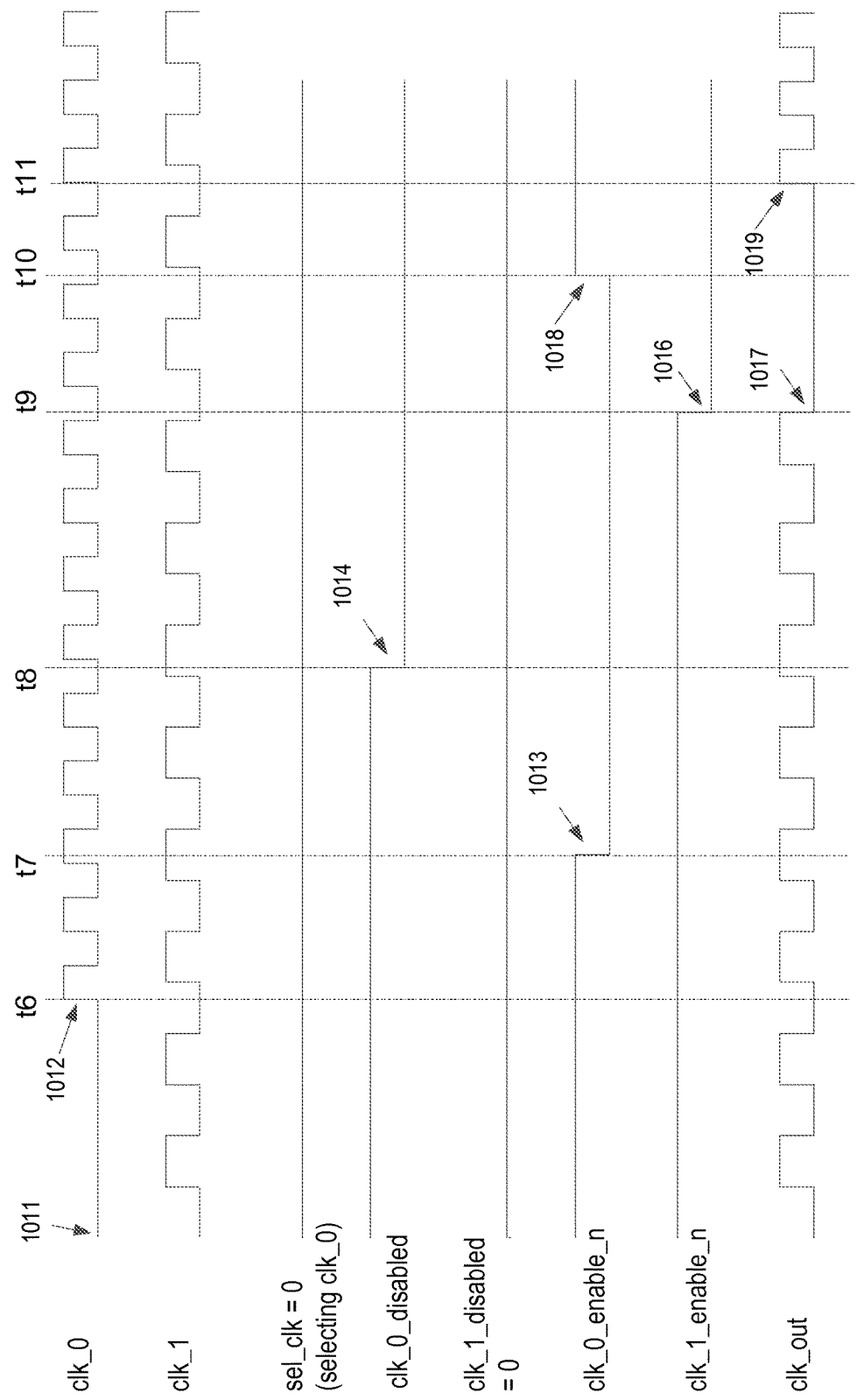

GLITCH-FREE CLOCK MULTIPLEXER

BACKGROUND

Many system-on-chips (SoCs) include multiple circuit modules operating at different clock frequencies. Further, an individual circuit module can also be operating at different clock frequencies depending on the state of the SoC. For example, the SoC may require certain circuit modules to be turned on and off or to be running at different clock frequencies depending on the state of the system. For example, the system can be in a power saving mode or a normal operating mode. It is often necessary to switch the source of a clock signal while the chip is running. This is usually implemented by multiplexing two different frequency clock sources in hardware and controlling the multiplexer select line by internal logic. These clock frequencies may not be synchronous with respect to each other, and they may not be synchronous with respect to clock control signals. Even when the signals are synchronous, the phase differences can create a glitch or short cycled output clock. A glitch on the clock line can affect the whole system, as it could be interpreted as a capture clock edge by some registers while missed by others.

It is therefore desirable to provide a system and method for allowing a SoC to turn on or off and switch clocks to any circuit modules on the SoC without causing any failure due to glitches in the clocking system.

BRIEF DESCRIPTION OF THE DRAWINGS

Various embodiments in accordance with the present disclosure will be described with reference to the drawings, in which:

FIG. 2 is a truth table illustrating the clock selection function of system in FIG. 1 according to an exemplary embodiment;

FIGS. 10A and 10B are timing diagrams illustrating timing waveforms of the clock multiplexing according to an exemplary embodiment;

DETAILED DESCRIPTION

Figure 1:
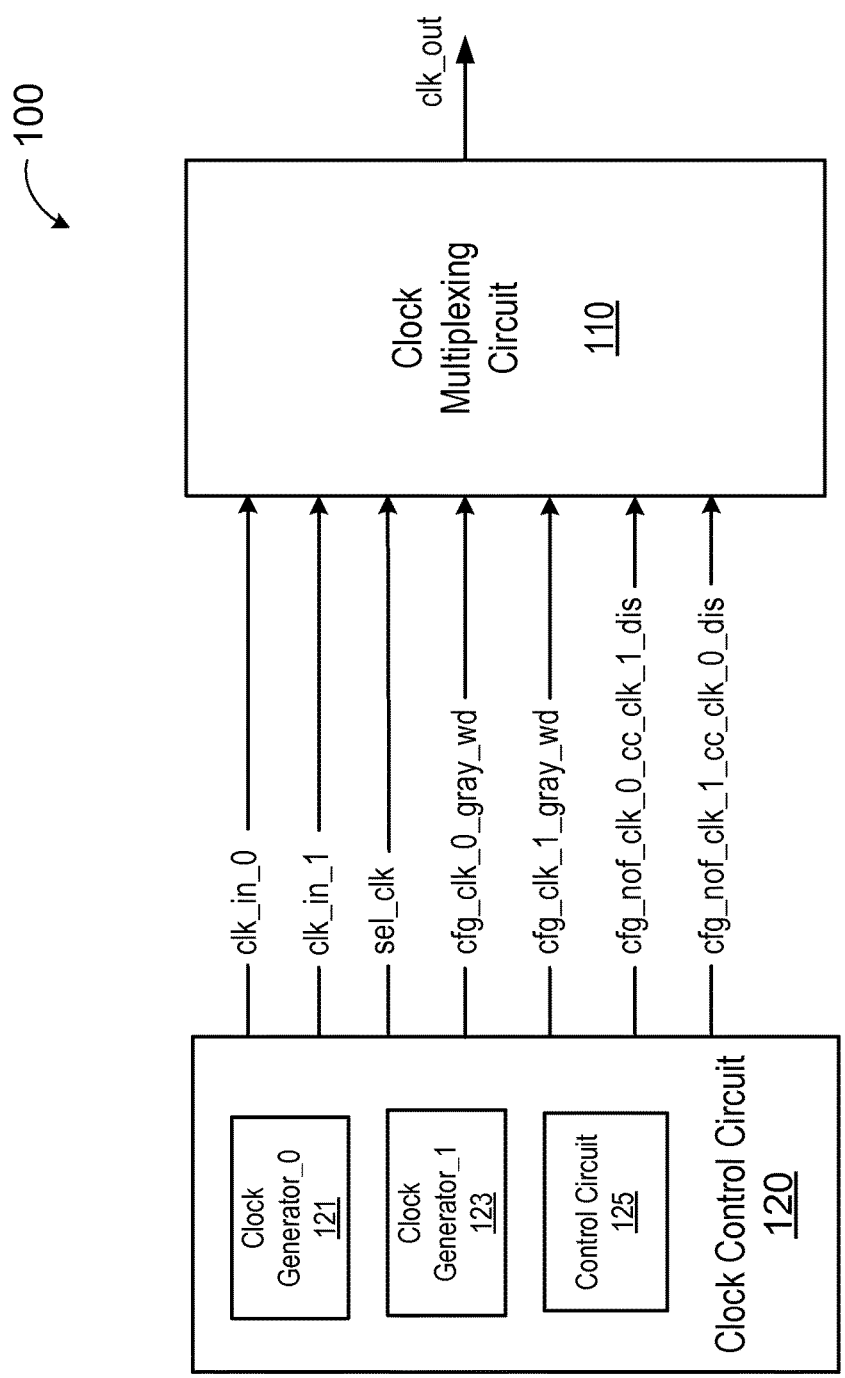
FIG. 1 is a block diagram illustrating a system for glitch-free clock multiplexing according to an exemplary embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a complex electronic circuit, such as system-on-chip, clock multiplexing is often used to switch between different clocks. Conventional glitch-free clock multiplexing circuits for switching between two clocks often require both of the clocks be active before and during the clock switching process. Techniques described herein include methods and systems for implementing glitch-free clock multiplexing between two or more clocks even when one of the clocks is not active. When it is detected that one of the clocks is disabled, the output clock is automatically switched to the active clock. Therefore, the output clock is always maintained active (toggling), even if the selected clock becomes not active, i.e., disabled. This feature is useful in many applications. For example, when an external clock is disconnected and certain circuits on chip or on board require an always active clock, the system can switch to an active internal clock. In another scenario, the system may use a fast clock for normal operation and a slower clock in sleep mode or low-power mode. If the selected clock becomes disabled, techniques described herein can be used to automatically switch to an active clock, in a glitch-free manner, to prevent interruption of the system operation.

Embodiments of the disclosed technologies provide methods for clock multiplexing which can perform glitch-free clock switching between two clocks. When one of the clocks is not active, the system automatically switches to the active clock. According to one embodiment, the first and second clocks are monitored to determine whether one or both clocks are active. If the first clock is active and the second clock is disabled, the first clock is selected as the output clock. If the first clock is disabled and the second clock is active, the second clock is selected as the output clock. If both the first clock and the second clock are active, then either the first clock or the second clock is selected to be the output clock according to a clock selection signal.

In some embodiments, each of the two clocks is used to determine whether the other clock is active or disabled. Therefore, the need in conventional clock multiplexing techniques to use a third clock for checking the status of the two clocks is eliminated. In some embodiments, a state machine in a first clock domain checks the status of the clock in a second clock domain. A clock counter in the second clock domain generates a clock count corresponding to the second clock. The clock count is monitored in the first clock domain, and if the clock count has not changed in a pre-set period of time, then the second clock is determined to be disabled. Otherwise, the second clock is determined to be active. The status of the first clock can be checked similarly in the second clock domain.

Glitch-free clock switching is provided by maintaining proper timing of signal propagation, for example, using delay circuit elements and clock edge triggering. In some embodiments, the output clock is allowed to switch from an initial clock to a selected clock only during a transition-free period of the initial clock. For example, an active and selected clock is not allowed to propagate until the other clock has stopped propagating. Further, when a clock becomes disabled or active, a clock status signal is updated to reflect this status change under a glitch-free condition. For example, in some embodiments, the clock status checking state machine is allowed to switch from a disabled state to an active state only when that clock is not selected and active. This condition is established to prevent direct feedthrough of the clock to the output stage, which might cause a glitch in the output clock. In some embodiments, a change in the clock selection signal or in one of the first and second clock status signals causes the clock selection circuit to switch the output clock after a first time delay in the first clock domain and a second time delay in the second clock domain.

In some embodiments, a clock multiplexing circuit includes a clock status detection circuit configured to monitor the status of a first clock and a second clock and generate clock status signals indicating whether each of the first and second clocks is active or disabled. The clock multiplexing circuit also includes a clock selection circuit configured to receive a clock selection signal and the clock status signals, and select one of the first and second clocks as an output clock as follows: the first clock is selected to be the output clock if the clock status signals indicate that the first clock is active and the second clock is disabled irrespective of the state of the clock selection signal; the second clock is selected to be the output clock if the clock status signals indicate that the first clock is disabled and the second clock is active irrespective of the state of the clock selection signal; and if the clock status signals indicate that the first and second clocks are active, then one of the first and second clocks is selected as the output clock according to the clock selection signal.

In some embodiments, a clock multiplexing circuit includes a first clock operating in a first clock domain and a second clock operating in a second clock domain. A clock status detection includes a first clock disable detection circuit and a second clock disable detection circuit. The first clock disable detection circuit is configured to determine in the first clock domain if the second clock is active or disabled and generate a first clock status signal, and the second clock disable detection circuit is configured to determine in the second clock domain if the first clock is active or disabled and generate a second clock status signal. Further, a clock selection circuit includes a first clock select control circuit, a second clock select control circuit, and a multiplexer circuit. The first clock select control circuit in the first clock domain is configured to receive a clock selection input signal and the first and second clock status signals, and provide a first clock enable signal, and the second clock select control circuit in the second clock domain is configured to receive the clock selection input signal and the first and second clock status signals, and provide a second clock enable signal. Moreover, the multiplexer circuit is coupled to receive the first and second clocks, as well as the first and second clock status signals and the first and second clock enable signals, and provide one of the first and second clocks as an output clock. The clock multiplexing circuit is configured to select the first clock to be the output clock if the first clock is active and the second clock is disabled, and select the second clock to be the output clock if the second clock is active and the first clock is disabled. If both the first clock and the second clock are active, the clock multiplexing circuit is configured to select either the first clock or the second clock to be the output clock according to the clock selection signal.

In some embodiments, a state machine in the first clock domain monitors a counter in the second clock domain for checking the status of the second clock. The state machine includes three states: an idle state, a count state, and a second-clock-disabled state. When the state machine is in the idle state, the state machine is configured to stay in the idle state if the first clock is active and selected or if the second clock is disabled. The state machine moves from the idle state to the count state if the count from the second clock domain has not changed between two consecutive clock cycles. When the state machine is in the count state, the state machine monitors the count using an internal counter, and moves to the second-clock-disabled state if the count from the second clock domain has not changed in a pre-set period of time, indicating that the second clock is not toggling. The state machine returns to the idle state if the count has changed or if the first clock is active and selected. When the state machine is in the second-clock-disabled state, the state machine moves to the idle state if the second clock is active and the second clock enable signal indicates that the second clock is not enabled, indicating that second clock is ready for use. This transition is configured to avoid a glitch during clock switch.

In some embodiments, the glitch-free clock multiplexing can be extended to a system of more than two clocks by cascading the two-clock multiplexing circuits as described in more detail further below.

In some embodiments, the system provides configuration parameters to the clock multiplexing circuit, for example, the width or the number of bits in the counter and the length of the pre-set period of time used for clock disable status checking. For example, these parameters can be selected based on the periods of the clocks.

FIG. 1 is a block diagram illustrating a system for glitch-free clock multiplexing according to an exemplary embodiment. As shown in FIG. 1, system 100 includes a clock multiplexing circuit 110 for multiplexing between two input clock signals, a first input clock clk_in_0 and a second input clock clk_in_1. Clock multiplexing circuit 110 is configured to provide an output clock clk_out in response to a clock selection signal, sel_clk, and the status of the two clocks. In some embodiments, the first and second clocks are monitored to determine whether one or both clocks are active. The first clock is selected to be the output clock if the first clock is active and the second clock is disabled, irrespective of the clock selection signal. The second clock is selected to be the output clock if the second clock is active and the first clock is disabled, irrespective of the clock selection signal. If both the first clock and the second clock are active, either the first clock or the second clock is selected according to the clock selection signal, sel_clk. In some embodiments, the two clocks, clk_in_0 and clk_in_1, can be asynchronous, and the selection signal sel_clk can be asynchronous to the two clocks, clk_in_0 and clk_in_1. In some embodiments, the two clocks may be an external clock and an internal clock. In some embodiments, the two clocks may be a fast clock and a slow clock. In some embodiments, clock multiplexing circuit 110 may also receive other input signals including configuration parameters such as cfg_clk_0_gray_wd, cfg_clk_1_gray_wd, cfg_nof_clk_0_cc_clk_1_dis, and cfg_nof_clk_1_cc_clk_0_dis, as shown in FIG. 1. The functions of these configuration parameters are explained in the examples below.

In some embodiments, system 100 may include a clock control circuit 120. In an embodiment, clock control circuit 120 includes two clock generator circuits, clock generator_0 (121) and clock generator_1 (123), and a control circuit 125. Clock generator_0 (121) is configured to provide a first clock, clk_in_0, and clock generator_1 (123) is configured to provide a second clock, clk_in_1. Control circuit 125 is configured to generate a clock selection signal, sel_clk, and other control signals. In some embodiments, one of the clock generators may receive a clock from an external source. Clock control circuit 120 can also be configured to provide the configuration parameters mentioned above. In some embodiments, clock control circuit 120 can reside in an external circuit.

FIG. 2 is a truth table 200 illustrating the clock selection function of system 100 in FIG. 1 according to an exemplary embodiment. As shown in FIG. 2, the two clocks can be either active or disabled. A clock is referred to as "active" when it is working or toggling, and a clock is referred to as "disabled" when it is not working or toggling. In system 100, at least one of the clocks is presumed to be working at a given time. Therefore, the condition of row 1 in the truth table where both clocks are disabled should not happen. If one of the clocks is disabled, then the active clock is automatically selected as the output clock, regardless of the state of the clock selection signal sel_clk, as shown in rows 2 and 3 in the truth table. Under these conditions, clock selection signal sel_clk is in a "don't care" condition. If both clocks are active, then one of two clocks is selected based on the value of the clock selection signal sel_clk. As shown in row 4 in the truth table, when sel_clk is 0, then the output clock clk_out is clk_in_0. As shown in row 5 in the truth table, when sel_clk is 1, then the output clock clk_out is clk_in_1. Of course, the logical stats of the signals can be assigned differently.

Figure 3:
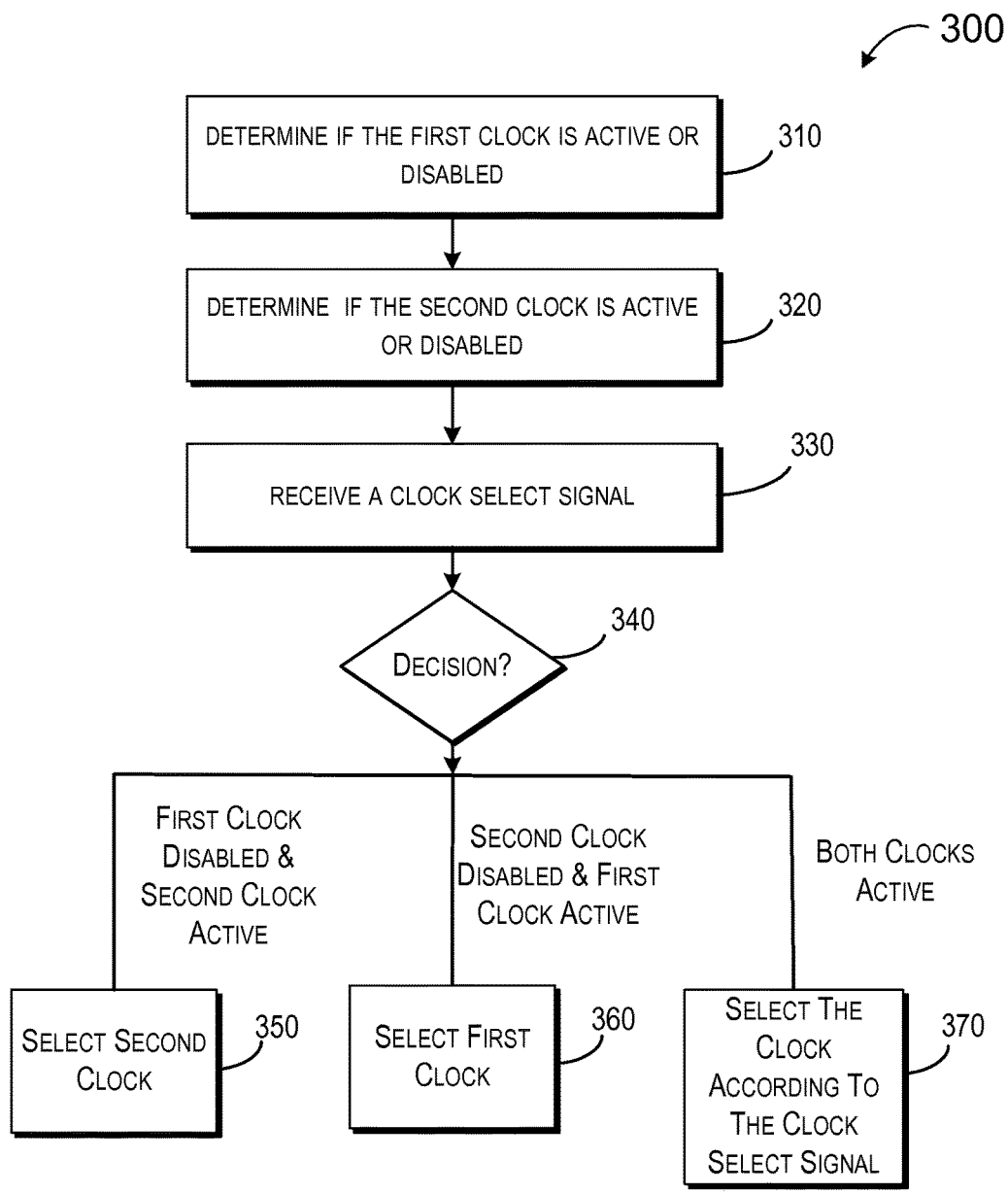
FIG. 3 is a simplified flowchart illustrating a method for clock multiplexing according to an exemplary embodiment.

FIG. 3 is a simplified flowchart illustrating a method for clock multiplexing according to an exemplary embodiment. As shown in FIG. 3, in a system having a first clock operating in a first clock domain and a second clock operating in a second clock domain, a method 300 for clock multiplexing includes the following processes.

Process 310: Determine if the first clock is either disabled or active;

Process 320: Determine if the second clock is either disabled or active;

Process 330: Receive a clock selection signal for selecting either the first clock or the second clock to be an output clock;

Process 340: Decision process, including the following conditions:

Process 350: Select the second clock to be the output clock if the first clock is disabled and the second clock is active;

Process 360: Select the first clock to be the output clock if the second clock is disabled and the first clock is active; and Process 370: If both clocks are active, select either the first clock or the second clock according to the clock selection signal.

At process 310, the method includes determining if the first clock is either disabled or active, and at process 320, the method includes determining if the second clock is either disabled or active. These processes do not need to be performed sequentially or in the order shown, and different methods can be used to determine the status of the clocks. In some embodiments, in a system of two clocks, the status of the first clock is determined in the second clock domain, and the status of the second clock in determined in the first clock domain. In these embodiments, there is no need for a third clock for checking the status of the two clocks. In some embodiments, determining in the first clock domain if the second clock is active or disabled includes providing a counter in the second clock domain that generates a count. The count is monitored in the first clock domain, and if the count has not changed in a pre-set period of time, then the second clock is determined to be disabled. Otherwise, the second clock is determined to be active. The status of the first clock can be determined similarly in the second clock domain.

At process 330, the system receives a clock selection signal for selecting either the first clock or the second clock to be an output clock. The clock selection signal can be a system control signal to switch between two clocks. For example, a part of the system may be running on a fast clock in normal operation, and may switch to a slower clock in a power saving mode. In embodiments of the disclosed technologies, the clock selection is made not only based on the clock selection signal, but also based on whether the selected clock is active or disabled. Further, if a clock is detected as being disabled, then the system automatically switches to the active clock. These actions are described in Processes 340-370. At Process 340, a clock selection decision is made that includes the following conditions: at Process 350, the second clock is selected to be the output clock if the first clock is disabled and the second clock is active; at Process 360, the first clock is selected to be the output clock if the second clock is disabled and the first clock is active; at Process 370, if both the first clock and the second clock are active, the system selects either the first clock or the second clock according to the clock selection signal.

Embodiments of the disclosed technologies provide a glitch-free clock multiplexing circuit that can implement the clock multiplexing method described above, as explained below with reference to FIGS. 4-16.

Figure 4:
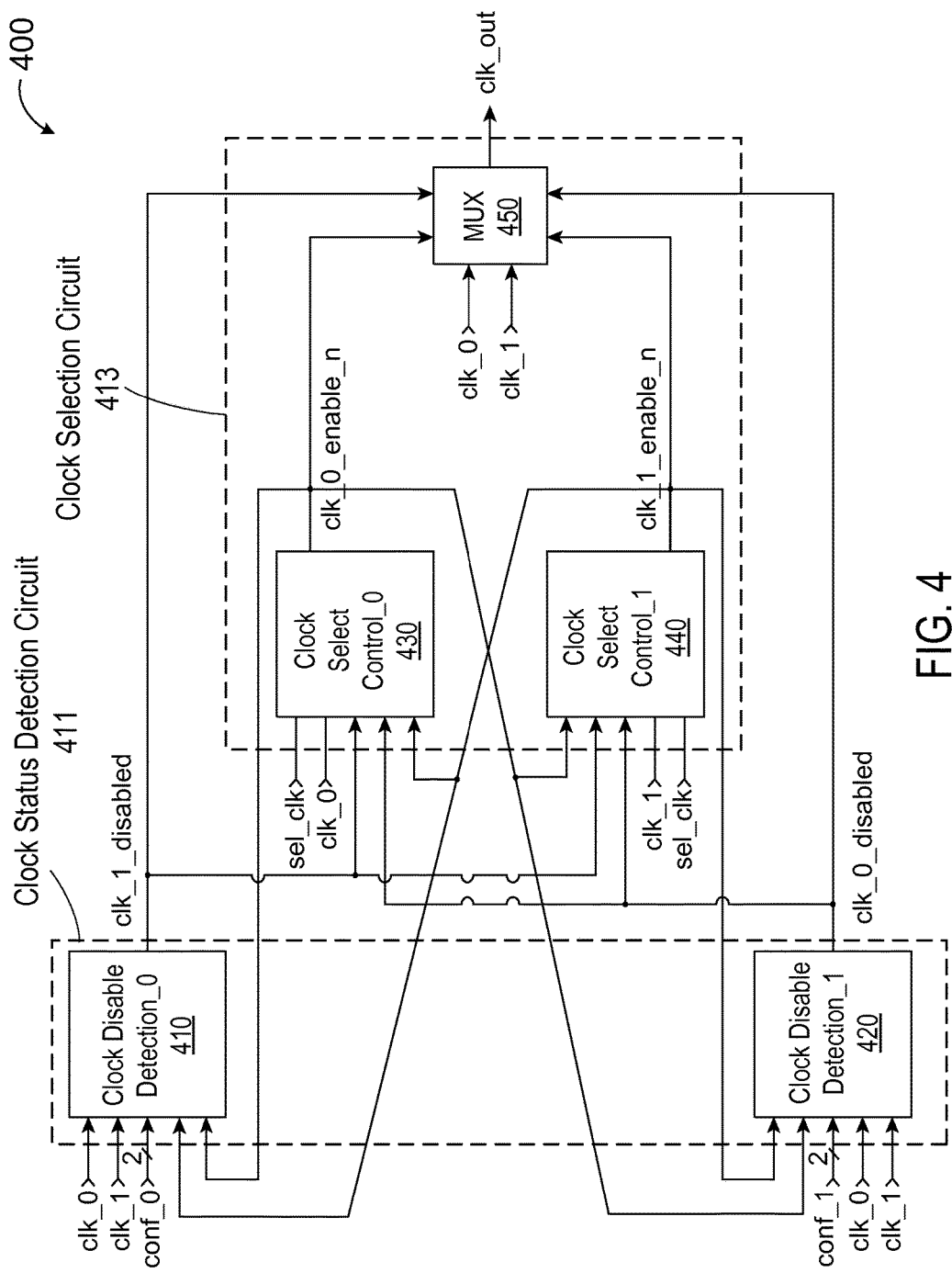
FIG. 4 is a block diagram of a clock multiplexing circuit according to an exemplary embodiment.

FIG. 4 is a block diagram of a clock multiplexing circuit according to an exemplary embodiment. In some embodiments, clock multiplexing circuit 400 can be used as clock multiplexing circuit 110 in system 100 in FIG. 1. Clock multiplexing circuit 400 includes a first clock clk_0 that operates in a first clock domain, and a second clock clk_1 that operates in a second clock domain. As shown in FIG. 4, clock multiplexing circuit 400 also includes a clock status detection circuit 411 and a clock selection circuit 413. Clock status detection circuit 411 includes a first clock disable detection 410 (Clock Disable Detection_0) configured to determine in the first clock domain if the second clock clk_1 is active or disabled, and a second clock disable detection circuit 420 (Clock Disable Detection_1) configured to determine in the second clock domain if the first clock clk_0 is active or disabled. Clock disable detection circuits 410 and 420 are further configured to provide clock status signals clk_0_disabled and clk_1_disabled, respectively, to indicate the status of the clocks.

Clock selection circuit 413 includes a first clock select control circuit 430 circuit and a second clock select control circuit 440. First clock select control circuit 430 is configured to operate based on clk_0 in the first clock domain and to receive a clock selection input signal sel_clk and provide a first clock enable signal clk_0 enable and a delayed version of first clock enable signal, clk_0_enable_n. In some embodiments, signals clk_0 enable and clk_0_enable_n indicate that clk_0 is selected and active and is ready to be used as the output clock, but they also include timing considerations for glitch-free clock switching as explained below. Similarly, second clock select control circuit 440 operates based on clk_1 in the second clock domain and is configured to receive clock selection input signal sel_clk and provide a second clock enable signal clk_1_enable and a delayed version clk_1_enable_n. Signals clk_1_enable and clk_1_enable_n indicate that clk_1 is selected and active and is ready to be used as the output clock, and they also include timing considerations for glitch-free clock switching.

In FIG. 4, MUX 450 receives the two clock signals clk_0 and clk_1. MUX 450 is also coupled to receive signals from first clock disable detection circuit 410, second clock disable detection circuit 420, first clock select control circuit 430, and second clock select control circuit 440, and provide one of the clock signals clk_0 and clk_1 as an output clock clk_out. MUX 450 is configured to select either clk_0 or clk_1 as the output clock signal clk_out in response to clk_0_disabled, clk_1_disabled, clk_0_enable_n, and clk_1_enable_n. In some embodiments, clock multiplexing circuit 400 is configured to select the first clock clk_0 to be the output clock if the first clock is active and the second clock clk_1 is disabled irrespective of the status of clock selection signal sel_clk, and selecting the second clock to be the output clock if the second clock is active and the first clock is disabled irrespective of the clock selection signal sel_clk. If both the first clock and the second clock are active, clock multiplexing circuit 400 is configured to select either the first clock clk_0 or the second clock clk_1 to be the output clock clk_out according to the clock selection signal sel_clk. As shown in FIG. 4, first clock disable detection circuit 410 also receives configuration parameters, collectively represented by conf_0, and second clock disable detection circuit 410 also receives configuration parameters, collectively represented by conf_1. The operations of the circuit blocks in clock multiplexing circuit 400 and the functions of the configuration parameters are explained below with reference to FIGS. 5-15.

Figure 5:
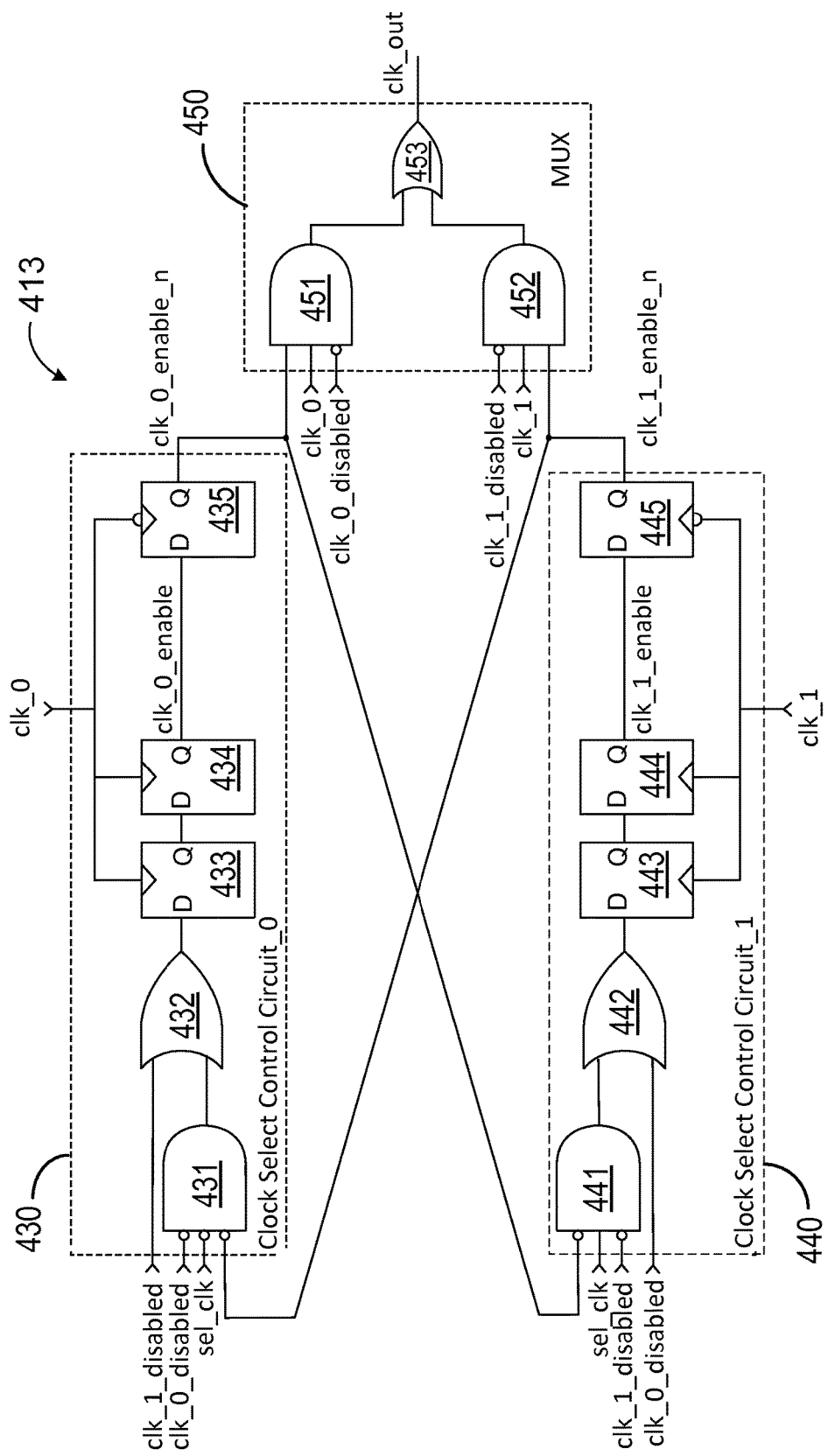
FIG. 5 is a circuit diagram illustrating a clock selection circuit as part of the clock multiplexing circuit in FIG. 4 according to an exemplary embodiment.

FIG. 5 is a circuit diagram showing details of clock selection circuit 413 in FIG. 4 according to an exemplary embodiment. In FIG. 5, clock selection circuit 413 includes first clock select control circuit 430 (also labeled as "Clock Select Control Circuit_0"), second clock select control circuit 440 (also labeled as "Clock Select Control Circuit_1"), and MUX 450. As shown in FIG. 5, first clock select control circuit 430 receives clock signal clk_0 to operate in the first clock domain. First clock select control circuit 430 also receives an external clock selection signal sel_clk. In addition, first clock select control circuit 430 receives three internally generated signals: clk_0_disabled and clk_1_disabled signals from clock status detection circuit 411 and clk_1_enabled_n from second clock select control circuit 440, and provides clk_0_enable and clk_0_enable_n signals. In this embodiment, first clock select control circuit 430 includes a three input AND gate 431, a two input OR gate 432, and three D-type flip-flops 433, 434, and 435. Flip-flops 433 and 434 are positive edge triggered flip-flops that function as a synchronizing and delay circuit. The output of flip-flop 434 provides the clk_0_enable signal, whose logic value is determined by the AND-OR circuit 431 and 432. It can be seen that clk_0_enable signal indicates that clk_0 is enabled when one or both of the following two conditions are true:
(A) clk_1 is disabled (clk_1_disabled=1), OR
(B) the following three conditions are all true:
clk_0 is selected (sel_clk=0) AND
clk_0 is active (clk_0_disabled=0) AND
clk_1 is not enabled (clk_1_enable_n=0).

In simplified terms, clk_0_enable signal can indicate either clk_1 is disabled or clk_0 is selected and not disabled (or active). In other words, clk_0_enable signal can indicate that clk_0 is ready for use. Note that, in this embodiment, clk_0_enable is not a logic opposite of clk_0_disabled. Instead, a clock is designated as active if it not disabled. In FIG. 5, flip-flop 435 is a negative edge triggered flip-flop, which receives the clk_0_enable signal to provide the clk_0_enable_n signal at a negative edge of clk_0. The delays provided by the synchronizer flip-flops 433 and 434 and negative edge triggered flip-flop 435 help to separate the transition of the clocks and to enable glitch-free clock multiplexing.

It can be seen in FIG. 5 that second clock select control circuit 440 has a similar circuit topology to first clock select control circuit 430. For example, second clock select control circuit 440 is configured to receive sel_clk, clk_0_disabled, clk_1_disabled, and clk_0_enable_n signals, and provide clk_1_enable and clk_1_enable_n signals. Second clock select control circuit 440 includes a three input AND gate 441, a two input OR gate 442 and three D-type flip-flops 443, 444, and 445. These signals and circuit elements have similar functions as their counterparts in first clock select control circuit 430.

In FIG. 5, MUX 450 includes three input AND gates 451 and 452, and a two input OR gate 453, and functions to provide one of clk_0 and clk_1 as output clock signal clk_out. AND gate 451 functions to provide clk_0 to OR gate 453 when input signals clk_0_enable_n is true and clk_0_disabled is false. As described above in connection with FIG. 4, clock status signal clk_0_disabled is generated by clock disable detection circuit 410, which indicates whether clk_0 is disabled or active. In other words, clk_0 can be provided as output clock clk_out only if clk_0 is active and enabled. A description of how clock status signal clk_0_disabled is generated is provided further below with reference to FIG. 11.

The operation of clock selection circuit 413 in FIG. 5 can be better understood by considering the following two scenarios separately, namely, (A) when only one of the clocks is disabled, and (B) when both clocks are active, i.e., both are not disabled. These scenarios are described below in detail with reference to FIGS. 6-10.

Figure 6:
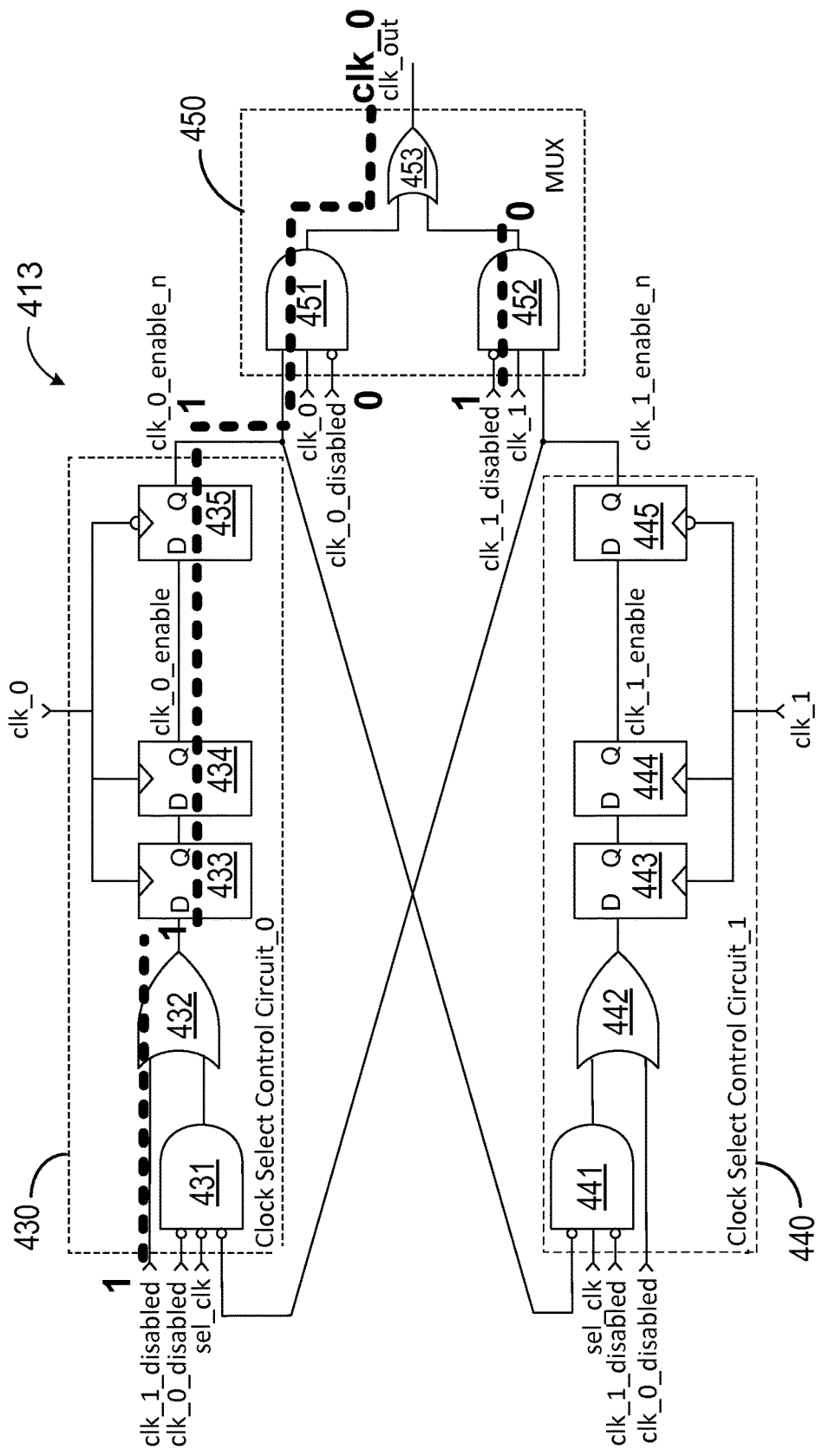
FIGS. 6 and 7 show the same circuit diagram as in FIG. 5, and highlight the relevant signal paths under the condition that one of the clocks is disabled.

FIG. 6 is a modified circuit diagram based on FIG. 5, and highlights the relevant signal paths under the condition that clk_1 is disabled, i.e., when clk_1_disabled=1 and clk_0_disabled=0. As shown by the thick broken lines, OR gate 432 receives clk_1_disabled=1, which is propagated through three flip-flops 433, 434, and 435 to reach AND gate 451 whose other input clk_0_disabled is 0. Therefore, clk_0 is passed through AND gate 451 to an input of OR gate 453. The other input to OR gate 453 is 0, because, as shown by the lower thick broken line, clk_1_disabled=1 at an input to AND gate 452 causes its output to be 0. Therefore, MUX 450 provides clk_0 as output clock clk_out.

Figure 7:
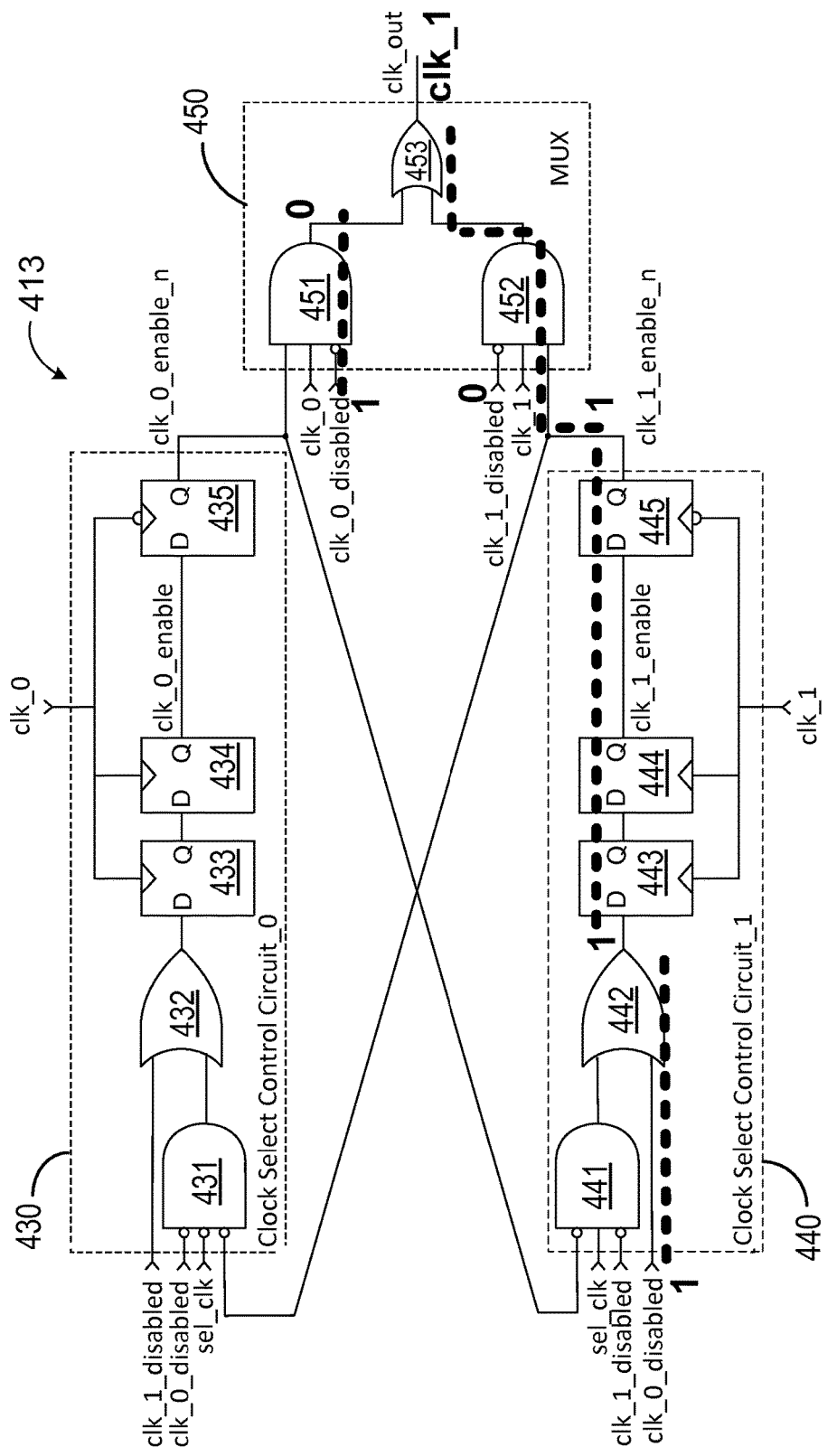

FIG. 7 is a modified circuit diagram based on FIG. 5, and highlights the relevant signal paths under the condition when clk_0 is disabled, i.e., when clk_0_disabled=1 and clk_1_disabled=0. The thick broken lines show that clk_1 is selected to be the output clock. The operations in this case are similar to those explained above in connection with FIG. 6 and thus will not be repeated.

Figure 8:
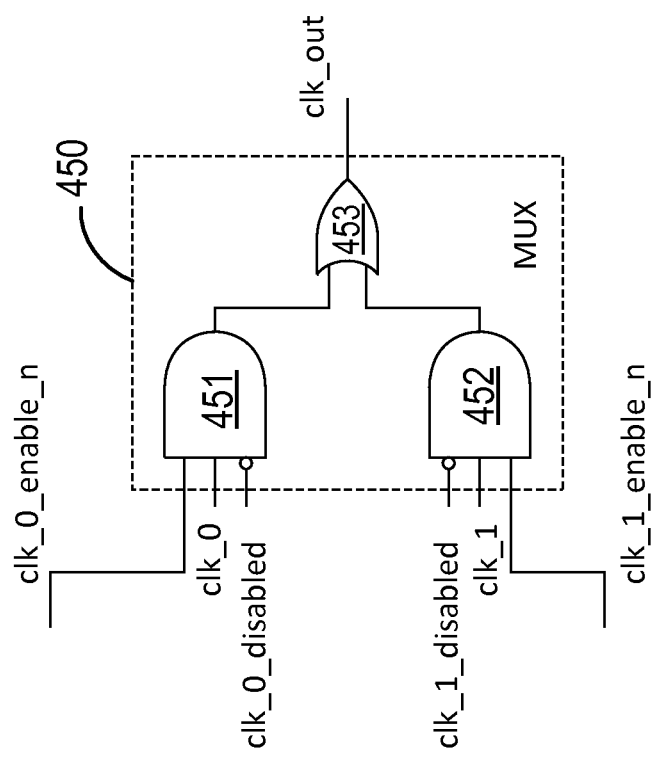
FIG. 8 shows the multiplexer circuit portion of the circuit diagram of FIG. 5.

FIG. 8 shows only the MUX 450 portion of FIG. 5. The configuration of AND gate 451 shows that if clk_0 becomes active, i.e., when clk_0_disabled becomes 0, while clk_0_enable_n is 1, clk_0 is immediately passed to OR gate 453 and would appear at output clk_out. If this condition takes place while the output clock is clk_1, glitches in the output clock may occur. Therefore, in order to prevent glitches, in some embodiments, the transition of clock status signal clk_0_disabled from 1 to 0 is configured to happen only when clk_0_enable_n is zero. Similarly, AND gate 452 is configured to receive three input signals and to provide clk_1 to OR gate 453 when clk_1_enable_n is true and clk_1_disabled is false. In embodiments of the disclosed technologies, the transition of clk_1_disabled from 1 to 0 is configured to happen only when clk_1_enable_n is zero. The transitions of clock status signals clk_0_disabled and clk_1_disabled are explained in more detail below with reference to the state machine in FIG. 14.

Figure 9:
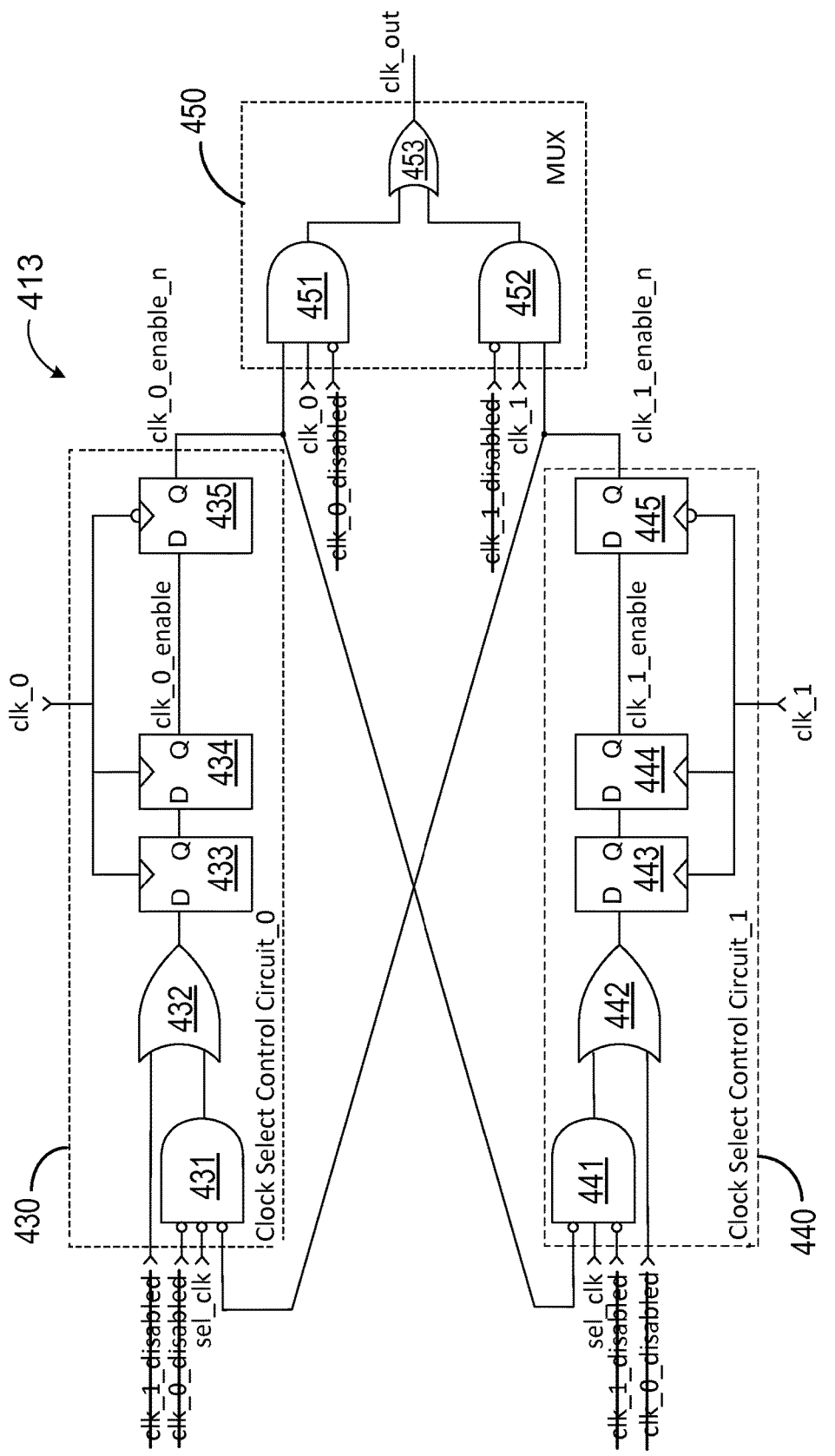
FIG. 9 shows the same circuit diagram as in FIG. 5, and highlights the relevant signal paths under the condition that both clocks are active.

FIG. 9 represents a modified circuit diagram based on FIG. 5, and highlights the relevant signal paths under the condition that both clocks are enabled, i.e., when clk_0_disabled=0 and clk_1_disabled=0. In FIG. 9, both clk_0_disabled and clk_1_disabled are 0, and thus they do not affect the circuit operation. Therefore, these signals are crossed out in FIG. 9 to simplify the illustration. Under this condition, the output clock is either clk_0 or clk_1 depending on the state of clock selection signal sel_clk. As indicated before, the D-type flip-flops are configured to provide synchronization and delay. The clk_0_enable and clk_0_enable_n signals indicate that clk_0 is selected and active, and the clk_1_enable and clk_1_enable_n signals indicate that clk_1 is selected and active. Negative triggered flip-flops 435 and 445 provide the clock enable signals at the next negative edge of the respective clocks in order to provide further timing margins. Further, the feedback path from clk_0_enable_n to clock selection circuit 440 allows clk_1 to be enabled only when the clk_0 is not enabled. Similarly, the feedback path from clk_1_enable_n to clock selection circuit 430 allows clk_0 to be enabled only when the clk_1 is not enabled. These design considerations ensure glitch-free clock multiplexing, as illustrated by the timing diagram in FIGS. 10A and 10B described next.

FIG. 10A is a timing diagram illustrating an example of clock multiplexing when a selected clock becomes disabled according to an exemplary embodiment. FIG. 10A shows several signals, and relevant events are marked with reference numerals 1001-1008. It can be seen that two input clock signals clk_0 and clk_1 are toggling at time t0 (1001). The clock selection signal sel_clk is equal to 0 or low, indicating clk_0 is selected to be the output clock clk_out (1002). Note that each logic signal is referred to as having a value of 0 or 1, or low or high, interchangeably. At time t0, both clocks are not disabled, and therefore, both clk_0_disabled and clk_1_disabled signals are 0. Since clk_0 is active and selected at time t0, clk_0_enabled_n is 1, and clk_1_enabled_n is 0. It can be seen that at time t1, clk_0 becomes disabled and stops toggling (1003), and output clock clk_out also stops toggling (1004). At clock t2, Clock Disable Detection_1 (420) in FIG. 4 sets the clk_0_disabled signal to 1 (1005) indicating that clk_0 is disabled. The time delay between t1 and t2 is determined by the operation of Clock Disable Detection_1 circuit 420 and can be varied by a configurable parameter for the clock status detection circuit. Note that the clk_0_enable_n signal remains at 1, because clk_0 is disabled and cannot trigger a change in the clk_0_enable_n signal. At time t3, the clk_1_enabled_n signal is turned on following a falling edge of clk_1 (1006). At time t4, the output clock clk_out is switched to clk_1 (1008).

FIG. 10B is a timing diagram illustrating an example of clock multiplexing when the disabled clock becomes active again according to an exemplary embodiment. It can be seen that, continuing the scenario from FIG. 10A, in the beginning (1011), clk_0 is disabled and clk_1 and output clock clk_out are toggling. At time t6, disabled clk_0 becomes active again (1012). At time t7, because clk_0 has now become active, the "clk_0_disabled=1" condition sets clk_0_enable_n to 0. At time t8, Clock Disable Detection_1 circuit 420 determines that clk_0 is active again and sets clk_0_disabled to 0 (1014). At time t9, clk_1_enabled_n becomes 0 (1016), which causes output clock clk_out to stop toggling (1017). Note that the delay between events 1014 and 1016 is caused by the delay elements in the clock selection circuit. At time t10, clk_1_enable_n=0 causes clk_0_enabled_n to be 1 (1018). At time t11, output clock clk_out switches to clk_0 (1019).

With the delays built in the clock selection circuit and the restrictions on state changes of the clk_0_disabled and clk_1_disabled signals, embodiments of the disclosed technologies are configured to provide glitch-free clock multiplexing. As described above, the clk_0_disabled and clk_1_disabled signals allow the clock multiplexing circuit to automatically switch clocks without glitches when one of the clocks is disabled. The determination of clk_0_disabled and clk_1_disabled signals are explained in more detail next.

Figure 11:
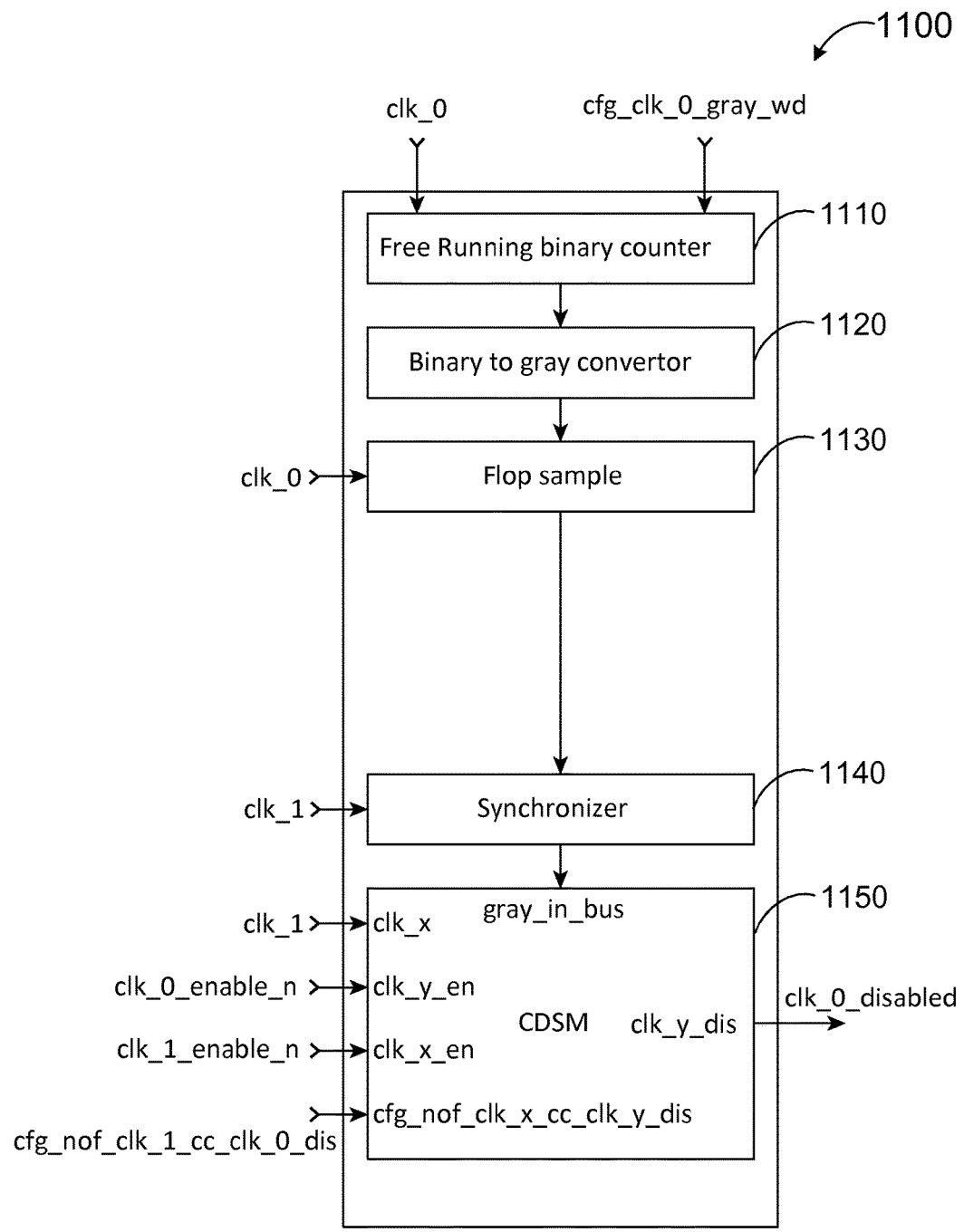
FIGS. 11 and 12 are block diagrams illustrating clock disable detection circuits according to an exemplary embodiment.

FIG. 11 is a block diagram illustrating a clock disable detection circuit 1100 according to an exemplary embodiment. Clock disable detection circuit 1100 can be used to implement clock disable detection circuit 420 which is part of clock multiplexing circuit 400 in FIG. 4. Clock disable detection circuit 1100 is configured to determine, in the clk_1 domain, the status of clk_0 and output a clock status signal clk_0_disabled to indicate whether clk_0 is disabled or active. A free running binary counter 1110 is implemented in the clk_0 domain. The width of the counter (number of bits) is determined by a configuration parameter cfg_clk_0_gray_wd, which can be provided by a control circuit in the system as shown in FIG. 1. In order to facilitate transfer between different clock domains, the binary count is converted to a Gray code count by a binary to gray converter 1120. The Gray code count is sampled in a flop sample 1130 in the clk_0 domain. Next, the Gray count is transferred to a synchronizer circuit 1140 in the clk_1 domain. A state machine 1150 in the clk_1 domain (labeled CDSM) receives the synchronized Gray count as the gray-in-bus signal. State machine 1150 is configured to determine the status of clk_0 in the clk_1 domain and to output the clock status signal clk_0_disabled indicating the same. State machine 1150 is also configured to receive clk_1, clk_0_enable_n, clk_1_enable_n, and cfg_nof_clk_1_cc_clk_0_dis signals, at inputs clk_x, clk_y_en, clk_x_en, and cfg_nof_clk_x_cc_clk_y_dis of state machine 1150, respectively.

Figure 12:
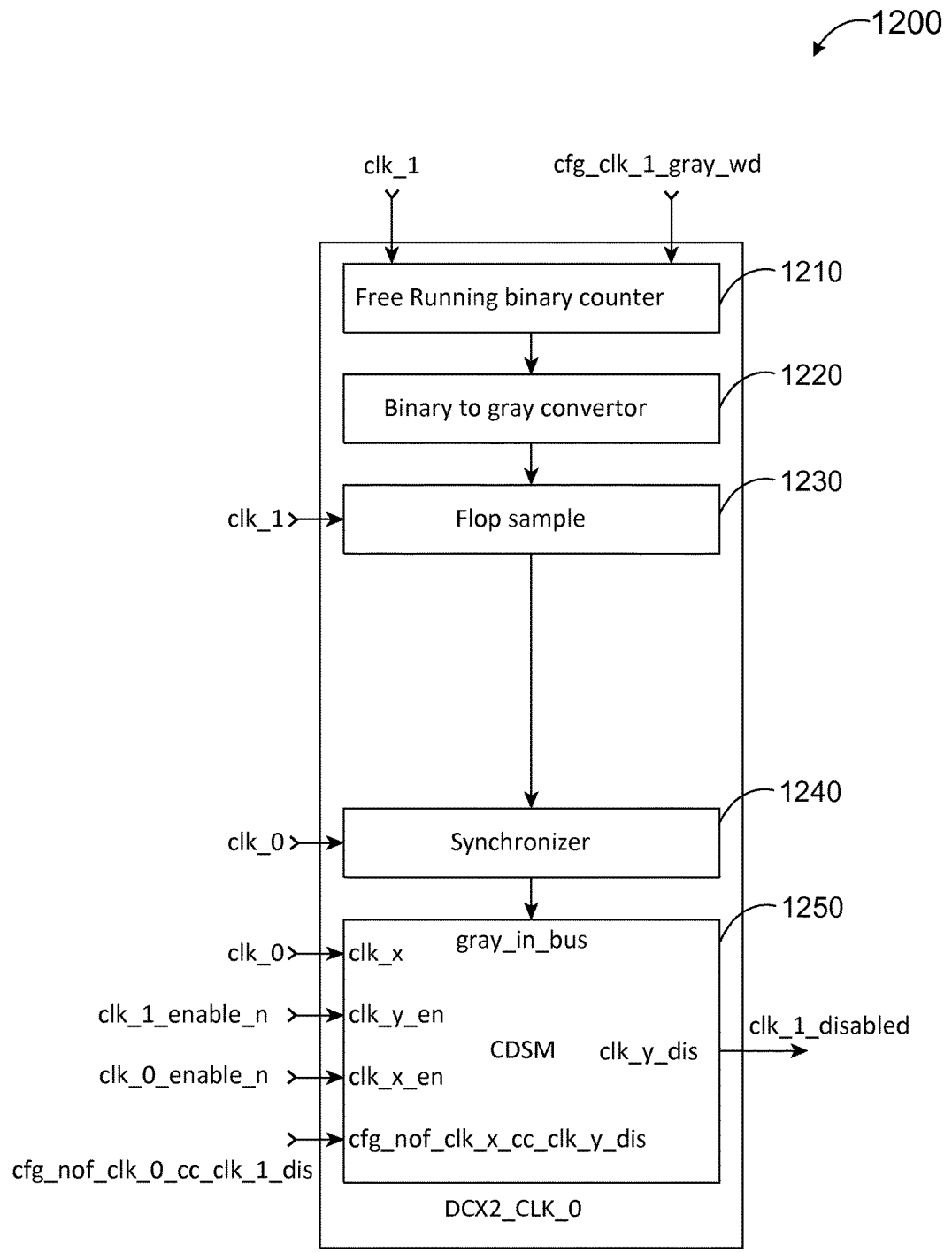

FIG. 12 is a block diagram illustrating a clock disable detection circuit 1200, which can be used to implement clock disable detection circuit 410 of clock multiplexing circuit 400 in FIG. 4. It can be seen that clock disable detection circuit 1200 is similar to clock disable detection circuit 1100 as shown in FIG. 11, but with the clock designations clk_0 and clk_1, and clk_x and clk_y, interchanged. Clock disable detection circuit 1200 is configured to determine, in the clk_0 domain, the status of clk_1 and output a clock status signal clk_1_disabled to indicate whether clk_1 is disabled or active. Clock disable detection circuit 1200 also includes a free running binary counter 1210, a binary to gray converter 1220, a flop sample 1230, a synchronizer circuit 1240, and a state machine 1250. The functions of clock disable detection circuit 1200 are similar to those in clock disable detection circuit 1100 and thus will not be described.

Figure 13:
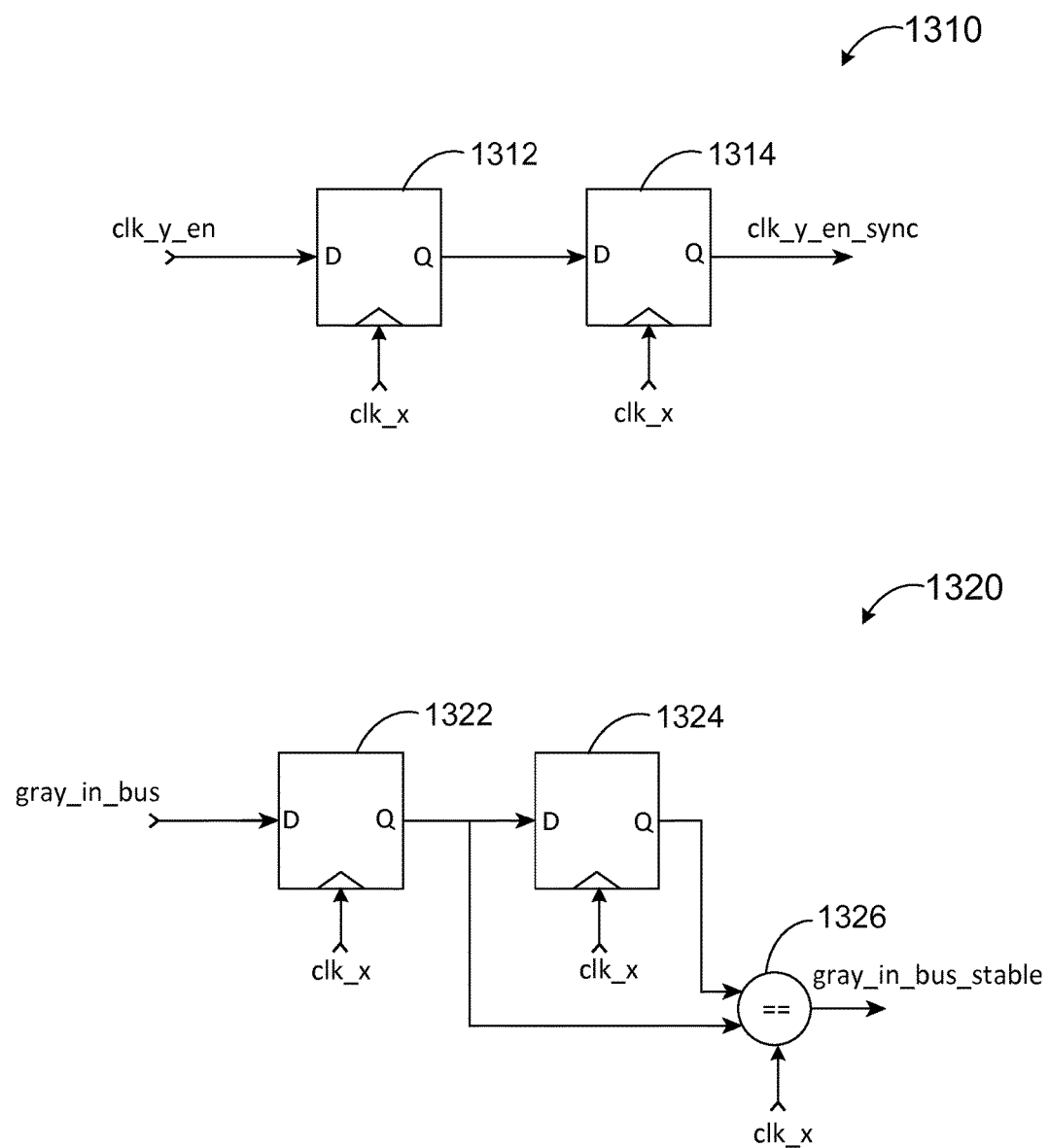
FIG. 13 illustrates logic diagrams of two supporting circuits in a state machine in the clock disable detection circuit.

FIG. 13 illustrates logic diagrams of two supporting circuits 1310 and 1320 used in each of state machines 1150 and 1250. Both circuits 1310 and 1320 operate in clk_x domain (i.e., in state machine 1150, circuits 1310 and 1320 operate in clk_1 domain, and in state machine 1250, they operate in clk_0 domain). Circuit 1310 is a synchronization circuit in which signal clk_y_en is synchronized through two D-type flip-flops 1312 and 1314 to become the clk_y_en_sync signal in the clk_x domain. As noted above in connection with FIG. 11, gray_in_bus is the Gray code count received from the free running clock in the clk_0 domain. In circuit 1320 shown in the lower part of FIG. 13, the gray_in_bus_stable signal is set to 1 if the gray_in_bus count value has not changed over consecutive clock cycles, indicating that clk_y has not toggled which informs the state machine to start tracking whether clk_y has become disabled. This circuit includes two D-type flip-flops 1322 and 1324, and a comparison circuit 1326. Use of these signals in the respective state machines will become more clear with reference to state machine 1400 described next.

Figure 14:
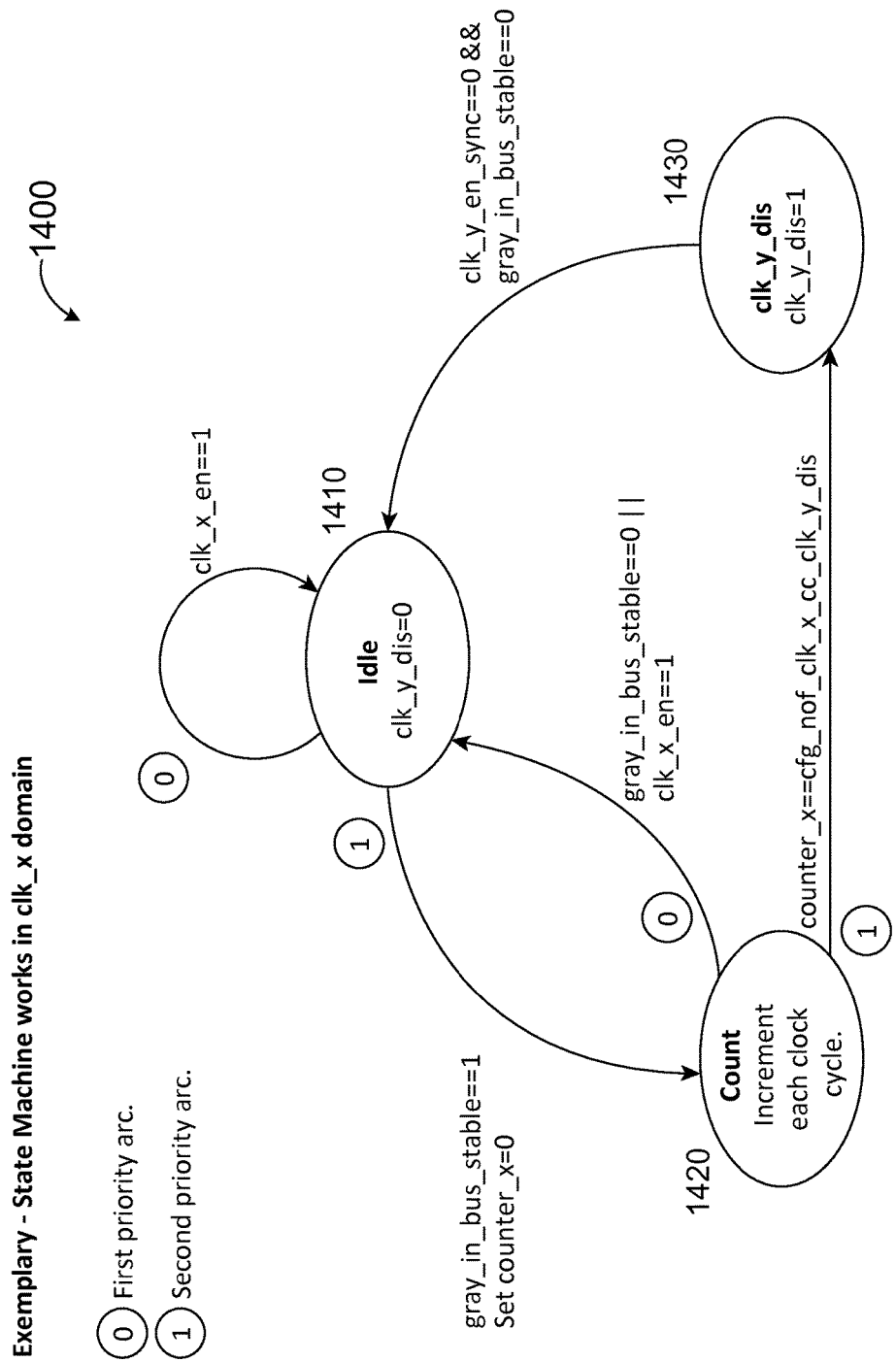
FIG. 14 is a flow diagram illustrating a state machine according to an exemplary embodiment.

FIG. 14 is a flow diagram illustrating a state machine 1400 according to an exemplary embodiment. State machine 1400 operates in the clk_x clock domain to determine the clock status of clk_y. It is to be understood that clk_x and clk_y can correspond to clk_0 and clk_1, or vice versa. State machine 1400 can be used as state machine 1150 in FIG. 11, which operates in the clk_1 domain to determine the clock status of clk_0, or as state machine 1250 in FIG. 12, which operates in the clk_0 domain to determine the clock status of clk_1. As shown in FIG. 14, state machine 1400 includes three states: an Idle state 1410, a Count state 1420, and a clk_y_dis state 1430. In Idle state 1410, the clock status signal clk_y_dis=zero, which means clk_y is not disabled. A transition arc 0 from Idle state 1410 back to Idle state 1410 under the condition clk_x_en=1 indicates that if clk_x is enabled, then the state machine stays in Idle state 1410. Under this condition, clk_x is selected and active, and there is no need to switch clocks. If clk_y has stopped toggling, i.e., is disabled, then the state machine moves from Idle state 1410 to Count state 1420, as shown by arc 1 from Idle state 1410, if the condition gray_in_bus_stable==1 is met, which indicates that clk_y is not toggling or is disabled. Under this condition, the state machine enters Count state 1420 to start monitoring the disable status of clk_y by setting the value of an internal counter, counter_x, to zero. In Count state 1420, if clk_y continues to be disabled, counter_x is incremented until it reaches a pre-set limit determined by a pre-set limit cfg_nof_clk_x_cc_clk_y_dis. If this condition is met, the state machine moves to clk_y_dis state 1430, and sets the clock status signal clk_y_dis to 1, as indicated by arc 1 from Count state 1420. The pre-set limit cfg_nof_clk_x_cc_clk_y_dis is a configurable parameter also shown in FIG. 1, which can be provided by the control circuit. In Count state 1420, transition arc 0 indicates that if clk_y starts to toggle again or if clk_x is selected and active, the state machine moves to Idle state 1410. This condition is indicated by the logic relationship gray_in_bus_stable==0||clk_x_en==1. In clk_y_dis state 1430, if clk_y starts to toggle, the state machine moves to Idle state 1410, but only under the condition that clk_y_en_sync signal is 0, as indicated by the logic relationship along the arc from state 1430 to 1410, clk_y_en_sync==0 && gray-in-bus_stable==0. This condition is implemented to satisfy the glitch-free requirement described above in connection with multiplexing circuit 450 in FIG. 8, i.e., the clk_y_disabled signal is changed from 1 to 0 only when clk_y_enable_n is zero. Another glitch-free condition is also met by the state machine, i.e., the clk_y_disabled signal changes from 0 to 1 only if clk_y is disabled (not toggled), as shown by arc 1 from Idle state 1410 to Count state 1420. In this case, since clk_y is disabled (not toggled) when the clk_y_disabled signal is changed, no glitch could occur.

Figure 15:
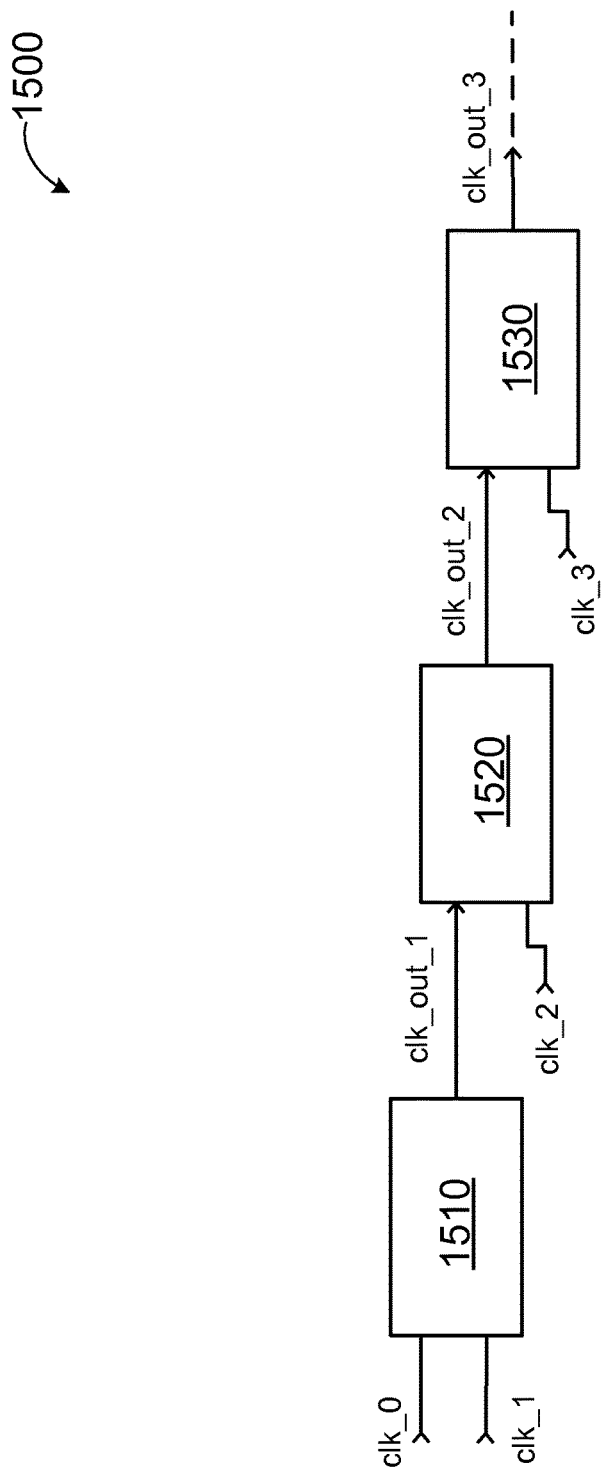
FIG. 15 is a simplified block diagram illustrating a system for clock multiplexing with more than two clocks according to an exemplary embodiment.

FIG. 15 is a simplified block diagram illustrating a system for clock multiplexing with more than two clocks according to an exemplary embodiment. As shown in FIG. 15, system 1500 includes more than two clocks, e.g., clk_1, clk_2, clk_3, . . . etc. System 1500 includes clock multiplexing circuits 1510, 1520, and 1530, etc., each of which is similar to clock multiplexing circuit 110 in FIG. 1. Each one of the clock multiplexing circuits in FIG. 15 is configured to select between two input clocks and provide the selected input clock as its output clock. Starting with second stage 1520, one of the two input clocks of each stage would be the output clock provided by the immediately preceding stage. For example, second stage 1520 receives the third clock clk_2 and one of the first and second clocks clk_0 and clk_1 as output clock clk_out_1 of first stage 1510. Similarly, clk_out_2 is the output clock of second stage 1520, and clk_out_3 is the output clock of third stage 1530. Thus, clock multiplexing system 1500 includes a cascaded arrangement of multiple clock multiplexing circuits for multiplexing among more than two clocks. In general, for multiplexing of an integer N clock signals, (N−1) stages of clock multiplexing circuit are needed in the cascaded arrangement.

Various embodiments for glitch-free clock multiplexing are descried above. The description and drawings are, accordingly, to be regarded in an illustrative rather than a restrictive sense. It will, however, be evident that various modifications and changes may be made. For example, the D-type flip-flops used in the above examples can be replaced with other clocked delay elements or registers. Further, the AND and OR gates used in the above examples can be replaced with similar logic elements such as NAND, NOR and inverter gates. Further, logic values 0 and 1, or low and high, can be used to represent true or false conditions, or vice versa.

Figure 16:
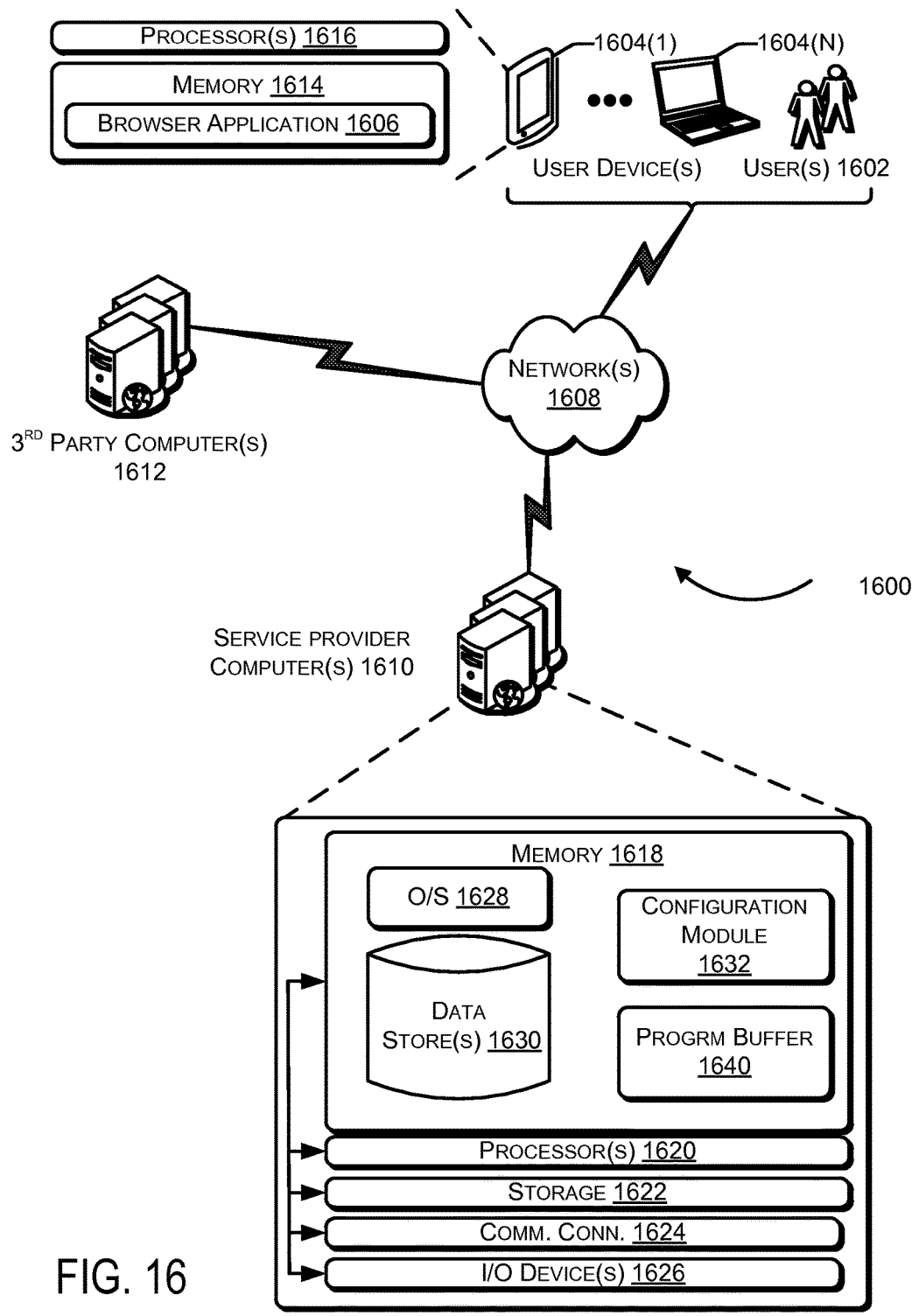
FIG. 16 illustrates an exemplary architecture for features and systems described herein that includes one or more service provider computers and/or a user device connected via one or more networks, according to at least one exemplary embodiment.

FIG. 16 illustrates an exemplary architecture for features and systems described herein that includes one or more service provider computers and/or a user device connected via one or more networks, according to at least one exemplary embodiment. The embodiments discussed in FIGS. 1-15 may be used in the computing devices described in FIG. 16, which can include clock multiplexing with two or more clocks. In architecture 1600, one or more users 1602 may utilize user computing devices 1604(1)-(N) (collectively, user devices 1604) to access application 1606 (e.g., a web browser or mobile device application), via one or more networks 16016. In some aspects, application 1606 may be hosted, managed and/or provided by a computing resources service or service provider. One or more service provider computers 1610 may provide a native application which is configured to run on user devices 1604 which user(s) 1602 may interact with. Service provider computer(s) 1610 may, in some examples, provide computing resources such as, but not limited to, client entities, low latency data storage, durable data storage, data access, management, virtualization, cloud-based software solutions, electronic content performance management, etc. Service provider computer(s) 1610 may also be operable to provide web hosting, computer application development and/or implementation platforms, combinations of the foregoing or the like to user(s) 1602. Service provider computer(s) 1610, in some examples, may communicate with one or more third party computers 1612.

In some examples, network(s) 1608 may include any one or a combination of many different types of networks, such as cable networks, the Internet, wireless networks, cellular networks and other private and/or public networks. While the illustrated example represents user(s) 1602 accessing application 1606 over network(s) 1608, the described techniques may equally apply in instances where user(s) 1602 interact with service provider computer(s) 1610 via user device(s) 1604 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1606 may allow user(s) 1602 to interact with service provider computer(s) 1610 such as to access web content (e.g., web pages, music, video, etc.). Service provider computer(s) 1610, perhaps arranged in a cluster of servers or as a server farm, may host application 1606 and/or cloud-based software services. Other server architectures may also be used to host application 1606. Application 1606 may be capable of handling requests from many users 1602 and serving, in response, various item web pages. Application 1606 can provide any type of website that supports user interaction, including social networking sites, online retailers, informational sites, blog sites, search engine sites, news and entertainment sites and so forth. As discussed above, the described techniques can similarly be implemented outside of application 1606, such as with other applications running on user device(s) 1604.

User device(s) 1604 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1604 may be in communication with service provider computer(s) 1610 via network(s) 1608, or via other network connections. Additionally, user device(s) 1604 may be part of the distributed system managed by, controlled by or otherwise part of service provider computer(s) 1610 (e.g., a console device integrated with service provider computers 1610).

In one illustrative configuration, user device(s) 1604 may include at least one memory 1614 and one or more processing units (or processor(s)) 1616. Processor(s) 1616 may be implemented as appropriate in hardware, computer-executable instructions, firmware, or combinations thereof. Computer-executable instruction or firmware implementations of processor(s) 1616 may include computer-executable or machine-executable instructions written in any suitable programming language to perform the various functions described. User device(s) 1604 may also include geo-location devices (e.g., a global positioning system (GPS) device or the like) for providing and/or recording geographic location information associated with user device(s) 1604.

Memory 1614 may store program instructions that are loadable and executable on processor(s) 1616, as well as data generated during the execution of these programs. Depending on the configuration and type of user device(s) 1604, memory 1614 may be volatile (such as random access memory (RAM)) and/or non-volatile (such as read-only memory (ROM), flash memory, etc.). User device(s) 1604 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1614 may include multiple different types of memory, such as static random access memory (SRAM), dynamic random access memory (DRAM), or ROM.

Turning to the contents of memory 1614 in more detail, memory 1614 may include an operating system and one or more application programs or services for implementing the features disclosed herein including at least a user provided input element or electronic service web page, such as via browser application 1606 or dedicated applications (e.g., smart phone applications, tablet applications, etc.). Browser application 1606 may be configured to receive, store and/or display a website or other interface for interacting with service provider computer(s) 1610. Additionally, memory 1614 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1604.

In some aspects, service provider computer(s) 1610 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1610 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1610 may be in communication with user device(s) 1604 and/or other service providers via network(s) 1608, or via other network connections. Service provider computer(s) 1610 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1610 may include at least one memory 1618 and one or more processing units (or processor(s)) 1620. Processor(s) 1620 may be implemented as appropriate in hardware, computer-executable instructions, firmware or combinations thereof. Computer-executable instruction or firmware implementations of processor(s) 1620 may include computer-executable or machine-executable instructions written in any suitable programming language to perform the various functions described.

In some instances, hardware processor(s) 1620 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1618 may store program instructions that are loadable and executable on processor(s) 1620, as well as data generated during the execution of these programs. Depending on the configuration and type of service provider computer(s) 1610, memory 1618 may be volatile (such as RAM) and/or non-volatile (such as ROM, flash memory, etc.). Service provider computer(s) 1610 or servers may also include additional storage 1622, which may include removable storage and/or non-removable storage. The additional storage 1622 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1618 may include multiple different types of memory, such as SRAM, DRAM, or ROM.

Memory 1618, the additional storage 1622, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1618 and the additional storage 1622 are all examples of computer storage media. Additional types of computer storage media that may be present in service provider computer(s) 1610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1610. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1610 may also contain communications connection(s) 1624 that allow service provider computer(s) 1610 to communicate with a stored database, another computing device or server, user terminals and/or other devices on network(s) 1608. Service provider computer(s) 1610 may also include I/O device(s) 1626, such as a keyboard, a mouse, a pen, a voice input device, a touch input device, a display, speakers, a printer and the like.

Memory 1618 may include an operating system 1628, one or more data stores 1630 and/or one or more application programs or services for implementing the features disclosed herein, including a configuration module 1632 and a program buffer 1640. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 16, and/or functions described herein can be provided by one or more modules that exist as separate modules and/or module functions described herein can be spread over multiple modules.

Figure 17:
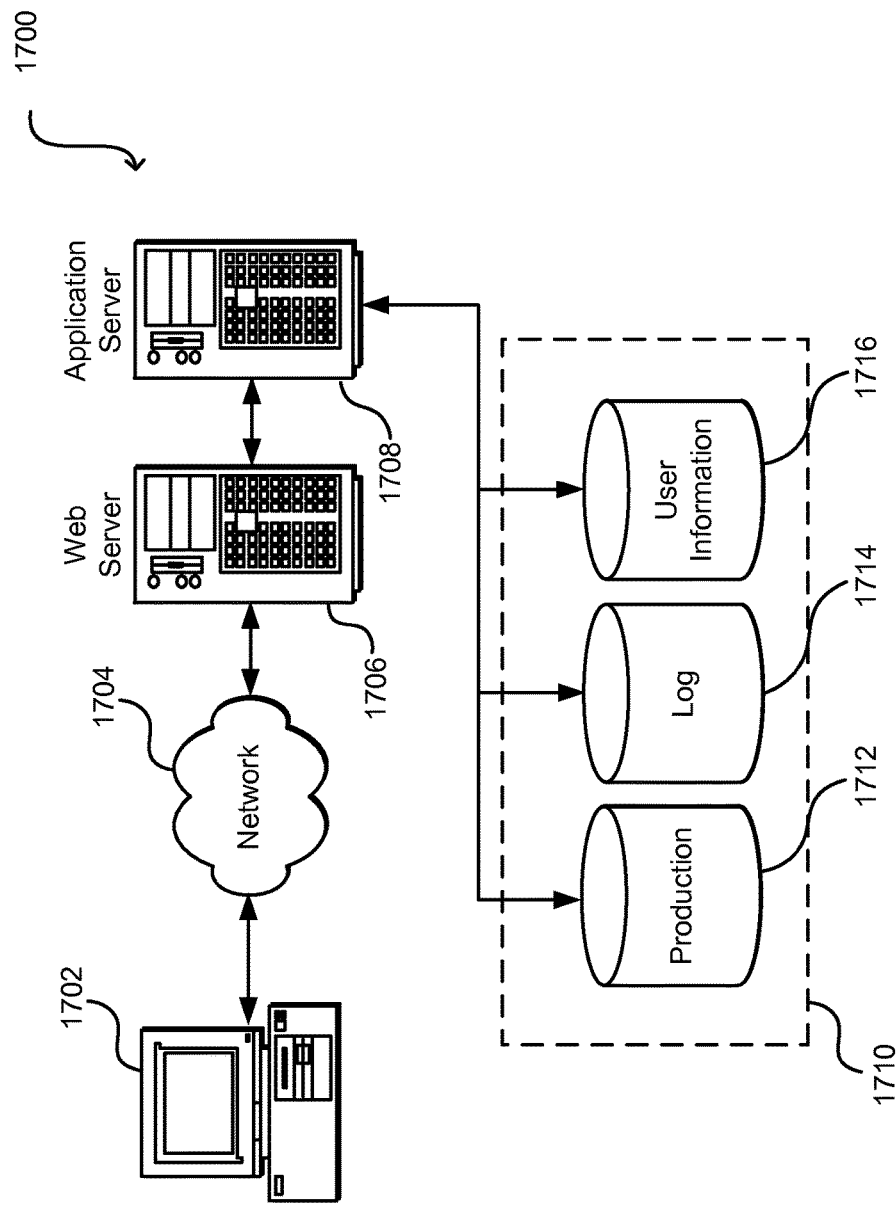
FIG. 17 illustrates aspects of an exemplary environment for implementing aspects in accordance with various embodiments.

FIG. 17 illustrates aspects of an example environment 1700 for implementing aspects in accordance with various embodiments. As will be appreciated, although a Web-based environment is used for purposes of explanation, different environments may be used, as appropriate, to implement various embodiments. The environment includes an electronic client device 1702, which can include any appropriate device operable to send and receive requests, messages or information over an appropriate network 1704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1706 for receiving requests and serving content in response thereto, although for other networks an alternative device serving a similar purpose could be used as would be apparent to one of ordinary skill in the art.

The illustrative environment includes at least one application server 1708 and a data store 1710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1702 and the application server 1708, can be handled by the Web server. It should be understood that the Web and application servers are not required and are merely example components, as structured code discussed herein can be executed on any appropriate device or host machine as discussed elsewhere herein.

The data store 1710 can include several separate data tables, databases or other data storage mechanisms and media for storing data relating to a particular aspect. For example, the data store illustrated includes mechanisms for storing production data 1712 and user information 1716, which can be used to serve content for the production side. The data store also is shown to include a mechanism for storing log data 1714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system 1700 in FIG. 17 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/ or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A clock multiplexing circuit, comprising:
    a first clock operating in a first clock domain;
    a second clock operating in a second clock domain;
    a first clock disable detection circuit configured to monitor, in the first clock domain, a first clock count corresponding to the second clock, and based on the first clock count provide a first clock status signal indicating whether the second clock is active or disabled;
    a second clock disable detection circuit configured to monitor, in the second domain, a second clock count corresponding to the first clock, and based on the second clock count provide a second clock status signal indicating whether the first clock is active or disabled; and
    a clock selection circuit configured to receive a clock selection signal, the first clock status signal, and the second clock status signal, and select one of the first and second clocks as an output clock as follows:
        select the first clock to be the output clock if the second clock status signal indicates that the first clock is active and the first clock status signal indicates that the second clock is disabled, irrespective of the state of the clock selection signal,
        select the second clock to be the output clock if the first clock status signal indicates that the second clock is active and the second clock status signal indicates that the first clock is disabled, irrespective of the state of the clock selection signal, or
        select one of the first and second clocks according to the clock selection signal if the first and second clock status signals indicate respectively that the first and second clocks are active.

2. The circuit of claim 1, wherein the clock selection circuit comprises:

a first clock select control circuit in the first clock domain configured to receive the clock selection signal, the first and second clock status signals, and a second clock enable signal, the first clock select control circuit configured to provide a first clock enable signal, wherein the first clock enable signal indicates either the second clock is disabled or the first clock is active and selected;

a second clock select control circuit in the second clock domain configured to receive the clock selection signal, the first and second clock status signals, and the first clock enable signal, the second clock select control circuit configured to provide the second clock enable signal, wherein the second clock enable signal indicates either the first clock is disabled or the second clock is active and selected; and a multiplexer coupled to the first and second clock disable detection circuits and the first and second clock select control circuits to receive the first and second clock enable signals and the first and second clock status signals for providing an output clock.

3. The circuit of claim 2, wherein the first clock select control circuit comprises a first delay circuit that includes one or more flip-flops responsive to a positive edge of the first clock and a flip-flop responsive to a negative edge of the first clock.

4. The circuit of claim 1, wherein the first clock disable detection circuit comprises:

a state machine in the first clock domain, the sate machine configured to receive a count from a counter circuit running in the second clock domain, the state machine further configured to:

monitor the count in the first clock domain;

if the count has not changed in a pre-set period of time, determine that the second clock is disabled; and otherwise, determine that the second clock is active.

5. The circuit of claim 4, wherein the state machine comprises an idle state, a count state, and a second-clock-disabled state, wherein, in the idle state, the state machine is configured to:

stay in the idle state if the first clock is active and selected or if the second clock is disabled; and move from the idle state to the count state to monitor the count from the second clock domain, if the count from the second clock domain has not changed between two consecutive clock cycles;

wherein, in the count state, the state machine is configured to:

monitor the count using an internal counter;

move to the second-clock-disabled state if the count from the second clock domain has not changed in a pre-set period of time; and return to the idle state if the count has changed or if the first clock is active and selected;

wherein, in the second-clock-disabled state, the state machine is configured to move to the idle state if the second clock is active and the second clock enable signal indicates that the second clock is not enabled.

6. A clock multiplexing circuit, comprising:

a first clock operating in a first clock domain;

a second clock operating in a second clock domain;

a clock status detection circuit configured to monitor the status of the first clock in the second clock domain and monitor the status of the second clock in the first clock domain, wherein the clock status detection circuit is further configured to generate clock status signals indicating whether each of the first and second clocks is active or disabled; and a clock selection circuit configured to receive a clock selection signal and the clock status signals, and select one of the first and second clocks as an output clock as follows:

select the first clock to be the output clock if the clock status signals indicate that the first clock is active and the second clock is disabled, select the second clock to be the output clock if the clock status signals indicate that the first clock is disabled and the second clock is active, or select one of the first and second clocks according to the clock selection signal if the clock status signals indicate that the first and second clocks are active.

7. The circuit of claim 6, wherein the clock status detection circuit comprises a first clock disable detection circuit and a second clock disable detection circuit, wherein:

the first clock disable detection circuit is configured to monitor a first clock count corresponding to the second clock to provide the first clock status signal indicating whether the second clock is active or disabled; and the second clock disable detection circuit is configured to monitor a second clock count corresponding to the first clock to provide the second clock status signal indicating whether the first clock is active or disabled.

8. The circuit of claim 7, wherein the first clock disable detection circuit is configured to determine that the first clock count has not changed in a first pre-set number of clock cycles of the first clock, and to determine that the second clock is disabled, and wherein the second clock disable detection circuit is configured to determine that the second clock count has not changed in a second pre-set number of clock cycles of the second clock, and to determine that the first clock is disabled.

9. The circuit of claim 7, wherein the first clock disable detection circuit comprises:

a state machine in the first clock domain, configured to receive a count from a counter circuit running in the second clock domain, the state machine further configured to:

monitor the count in the first clock domain;

if the count has not changed in a pre-set period of time, determine that the second clock is disabled; and otherwise, determine that the second clock is active.

10. The circuit of claim 9, wherein the state machine comprises an idle state, a count state, and a second-clock-disabled state, wherein, in the idle state, the state machine is configured to:

stay in the idle state if the first clock is active and selected or if the second clock is disabled; and move from the idle state to the count state to monitor the count from the second clock domain, if the count from the second clock domain has not changed between two consecutive clock cycles;

wherein, in the count state, the state machine is configured to:

monitor the count using an internal counter;

move to the second-clock-disabled state if the count from the second clock domain has not changed in a pre-set period of time; and return to the idle state if the count has changed or if the first clock is active and selected;

wherein, in the second-clock-disabled state, the state machine is configured to move to the idle state if the second clock is active and the second clock enable signal indicates that the second clock is not enabled.

11. The circuit of claim 6, wherein the clock selection circuit comprises:
- a first clock select control circuit in the first clock domain configured to receive the clock selection signal, the first and second clock status signals, and a second clock enable signal, the first clock select control circuit configured to provide a first clock enable signal, wherein the first clock enable signal indicates either the second clock is disabled or the first clock is active and selected;
- a second clock select control circuit in the second clock domain configured to receive the clock selection signal, the first and second clock status signals, and the first clock enable signal, the second clock select control circuit providing the second clock enable signal, wherein the second clock enable signal indicates either the first clock is disabled or the second clock is active and selected; and
- a multiplexer coupled to the first and second clock disable detection circuits and the first and second clock select control circuits to receive the first and second clock enable signals and the first and second clock status signals for providing an output clock.

12. The circuit of claim 11, wherein the first clock select control circuit further comprises a first delay circuit, and a change in the first and second clock status signals or the clock selection signal causes a change to the clock enable signal after a first time delay provided by the first delay circuit.

13. The circuit of claim 12, wherein the first delay circuit in the first clock select control circuit comprises one or more flip-flops responsive to a positive edge of the first clock and a flip-flop responsive to a negative edge of the first clock.

14. A method for clock multiplexing, the method comprising:
- determining, in a first clock domain with a first clock, if a second clock in a second clock domain is either disabled or active;
- determining, in the second clock domain, if the first clock in the first clock domain is either disabled or active;
- receiving a clock selection signal for selecting either the first clock or the second clock to be an output clock;
- if the second clock is disabled and the first clock is active, selecting the first clock to be the output clock irrespective of the clock selection signal;
- if the first clock is disabled and the second clock is active, selecting the second clock to be the output clock irrespective of the clock selection signal; or
- if both the first clock and the second clock are active, selecting either the first clock or the second clock to be the output clock according to the clock selection signal.

15. The method of claim 14, wherein determining in the first clock domain if the second clock is active or disabled comprises:
- providing a counter in the second clock domain, and sending a count from the counter to the first clock domain;
- in the first clock domain, receiving the count from the second clock domain;
- monitoring the count in the first clock domain; and
- upon determining that the count has not changed in a pre-set period of time, determining that the second clock is disabled.

16. The method of claim 15, further comprising:
determining a first clock enable signal and a second clock enable signal;
wherein the first clock enable signal is configured to indicate either that:
- the second clock is disabled, or
- the first clock is selected and active, and the second clock is not enabled;

wherein the second clock enable signal is configured to indicate either that:
- the first clock is disabled, or
- the second clock is selected and active, and the first clock is not enabled.

17. The method of claim 14, wherein the first clock is selected to be the output clock when the first clock enable signal indicates that the first clock signal is enabled after a negative edge of the first clock.

18. The method of claim 14, wherein the second clock is selected to be the output clock when the second clock enable signal indicates that the second clock signal is enabled after a negative edge of the second clock.

19. The method of claim 15, wherein the counter in the second clock domain is a binary counter, the method further comprising converting a binary count to a Gray code count.

20. The method of claim 15, wherein monitoring the count in the first clock domain comprises using an internal counter to determine if the count has not changed in a pre-set period of time.

* * * * *